Nov. 28, 1939.   F. B. STONE ET AL   2,181,214
PACKAGE MAKING MACHINE
Filed May 18, 1936    8 Sheets-Sheet 1

Inventors
Floyd B. Stone
Russell C. Arquette
Charles F. Rossetter
Richard J. Rossetter BY Lyon & Lyon
ATTORNEYS

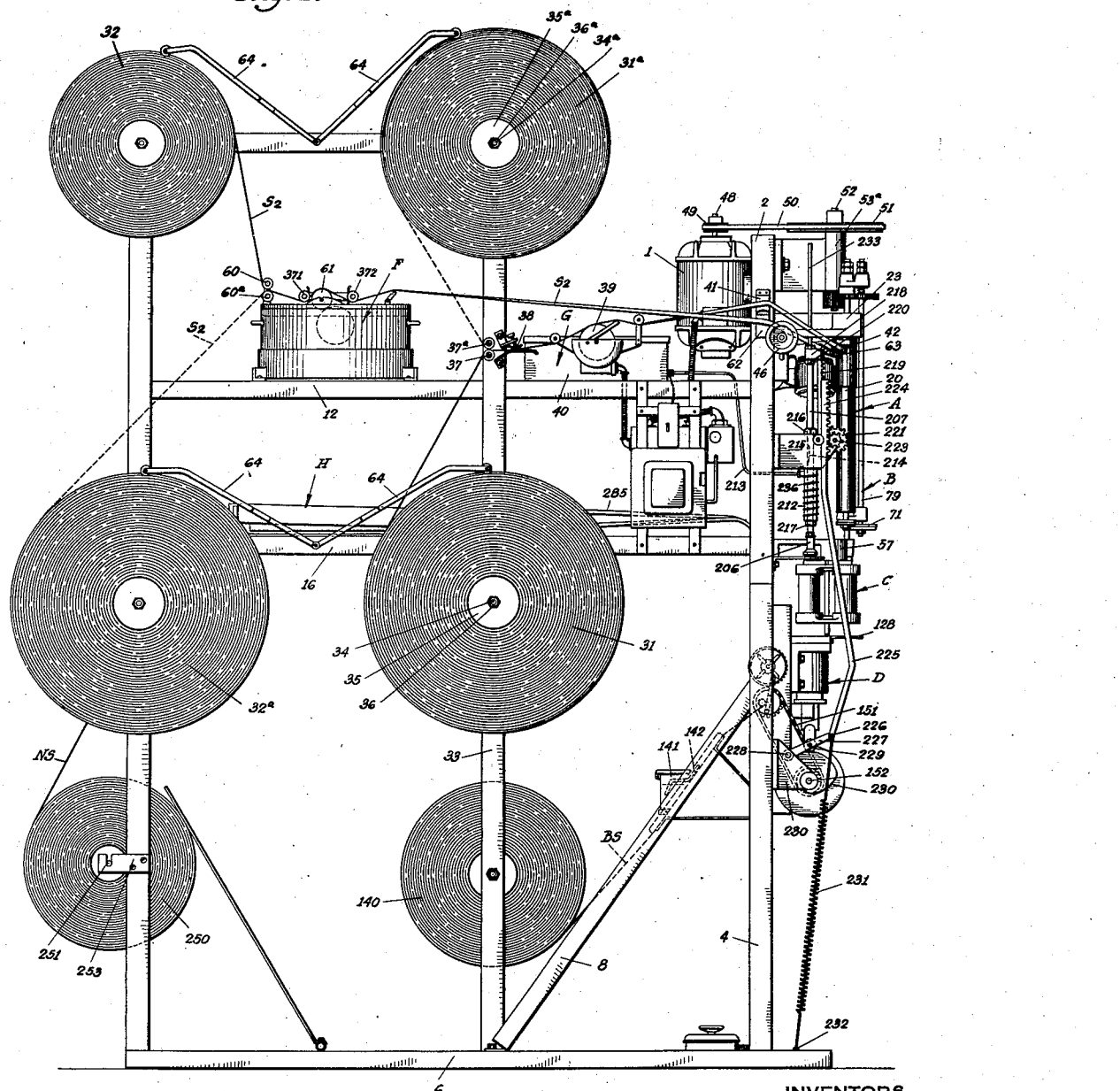

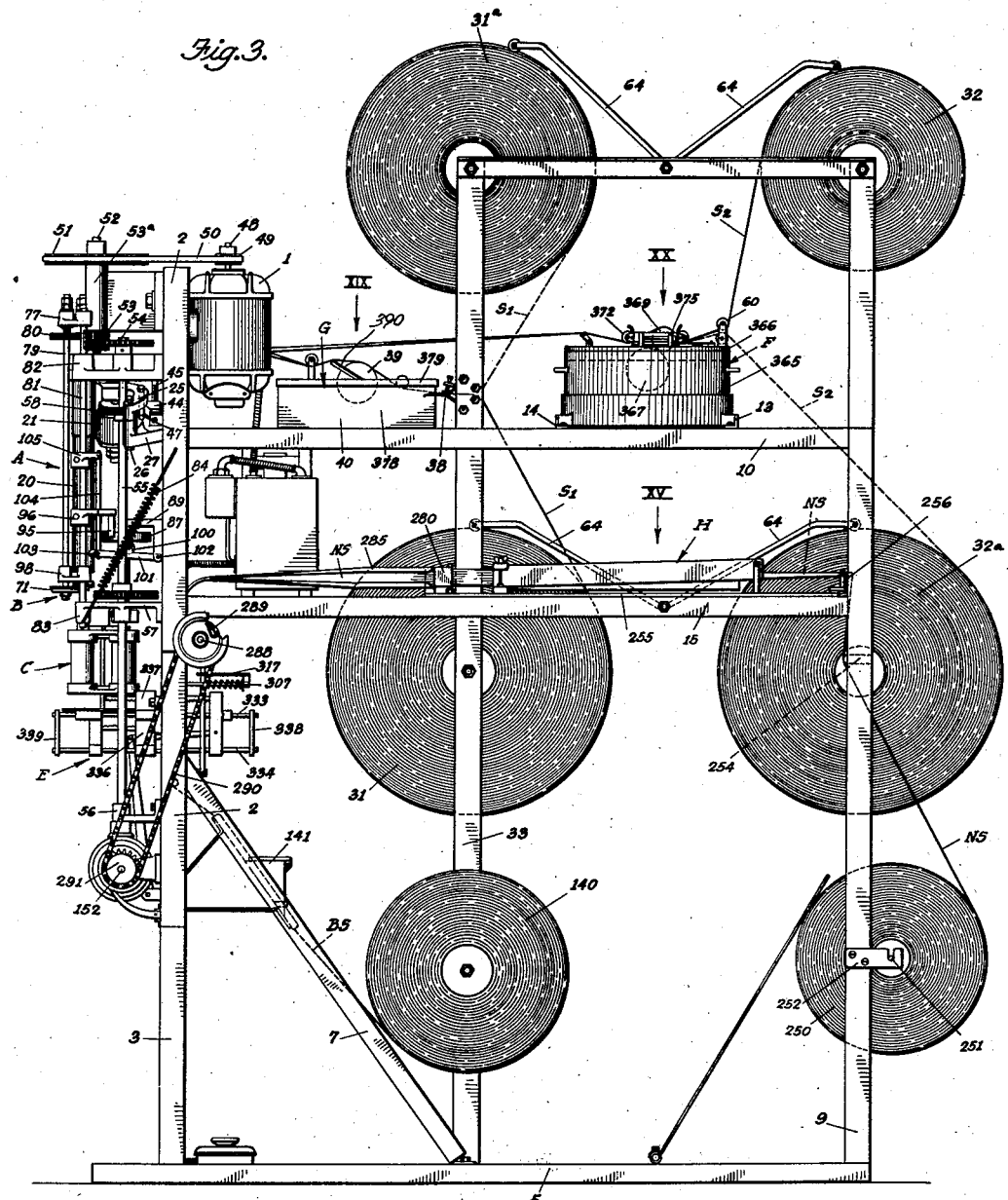

Nov. 28, 1939.   F. B. STONE ET AL   2,181,214
PACKAGE MAKING MACHINE
Filed May 18, 1936   8 Sheets-Sheet 4
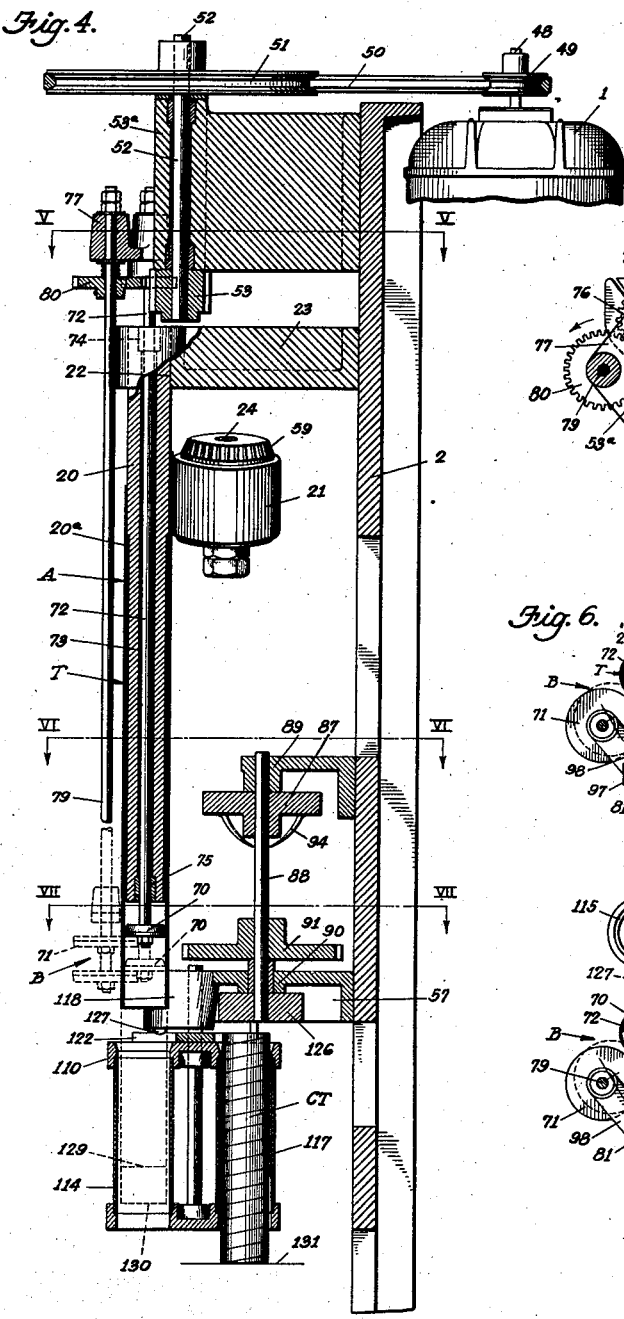
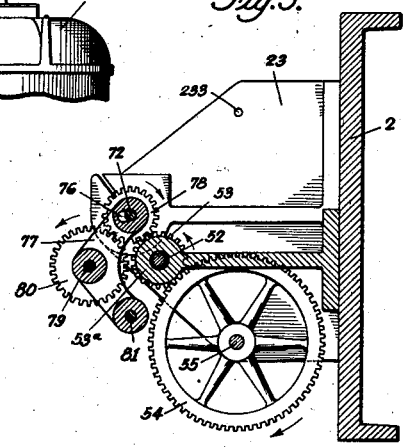
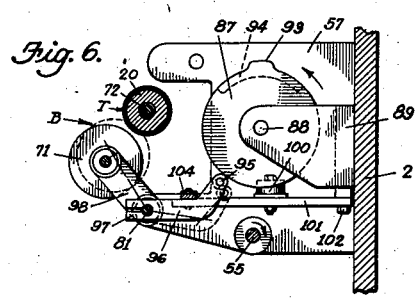
INVENTORS
Floyd B. Stone
Russell C. Arquette
Charles F. Rossetter
Richard J. Rossetter
BY Lyon & Lyon
ATTORNEYS Nov. 28, 1939.    F. B. STONE ET AL    2,181,214
PACKAGE MAKING MACHINE
Filed May 18, 1936    8 Sheets-Sheet 5
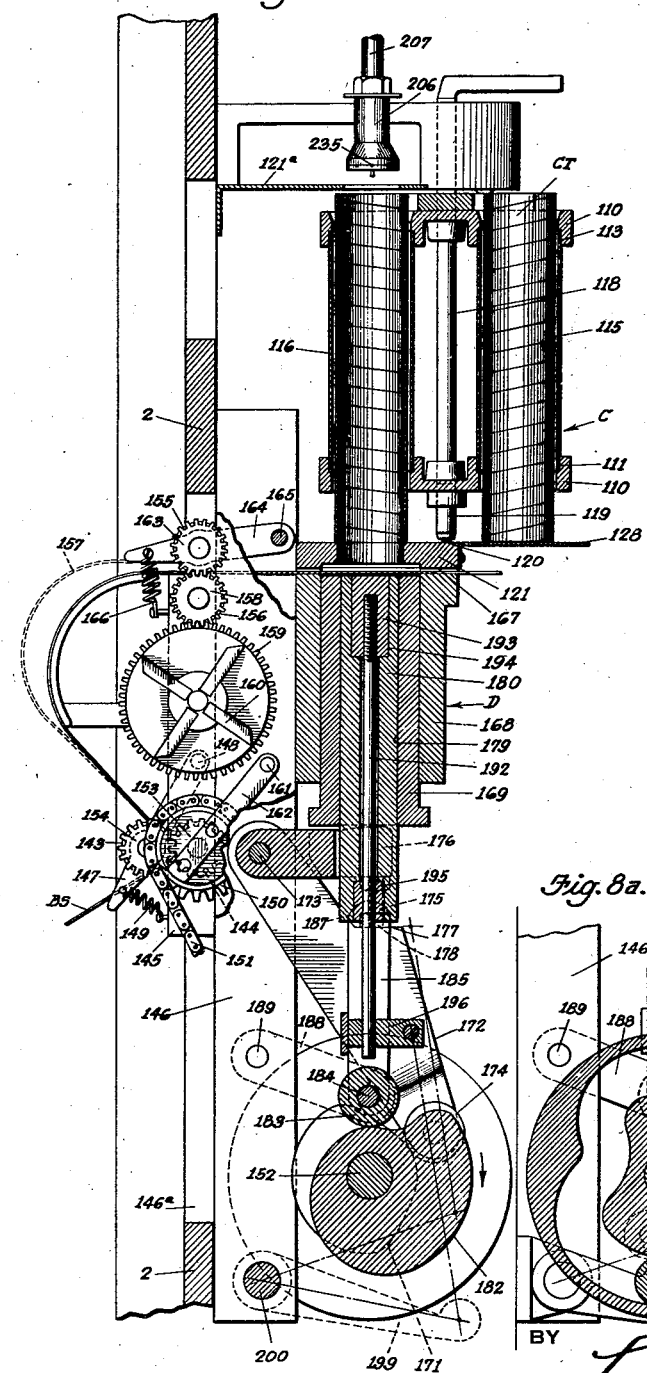
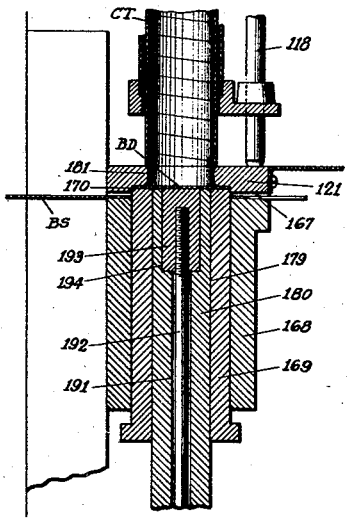
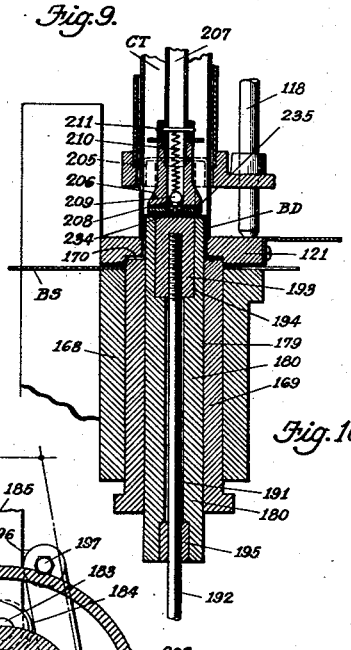
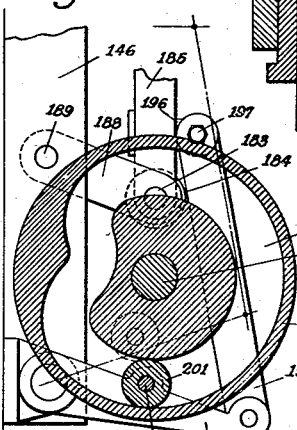
INVENTORS
Floyd B. Stone
Russell C. Arquette
Charles F. Rossetter
Richard J. Rossetter
BY Lyon & Lyon
ATTORNEYS

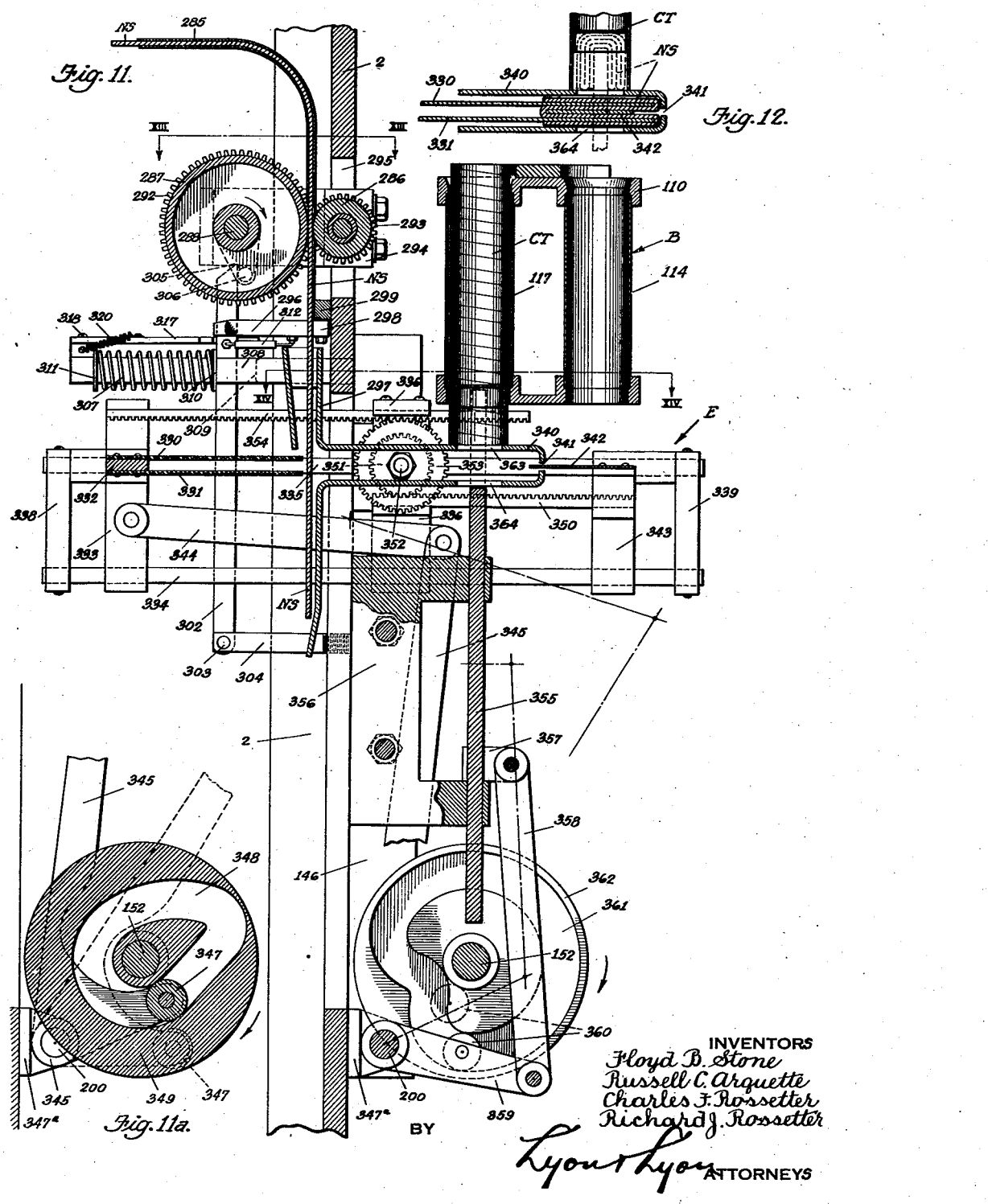

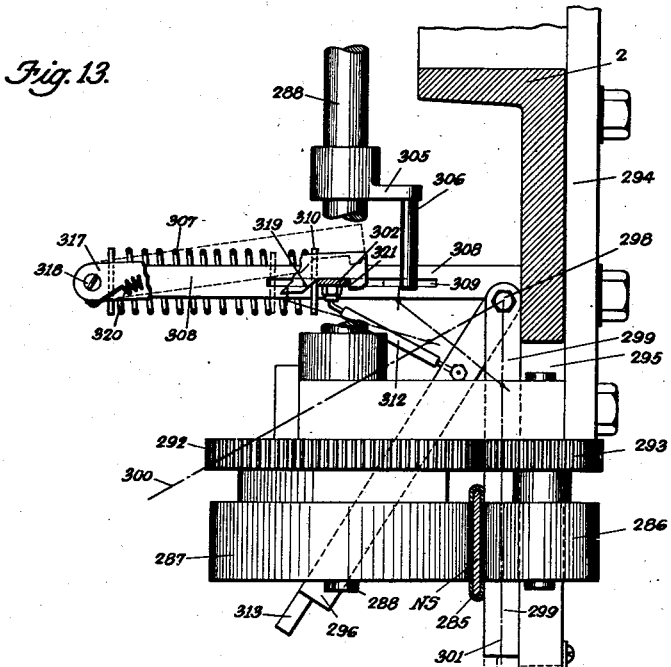
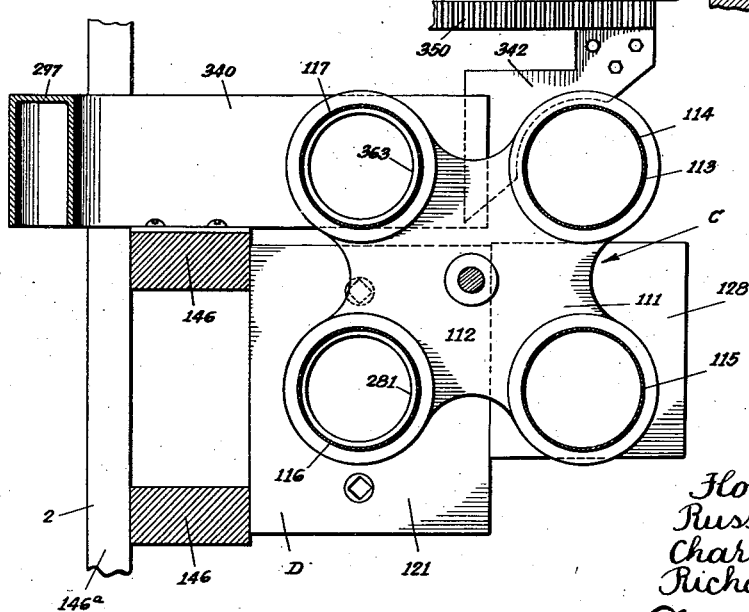

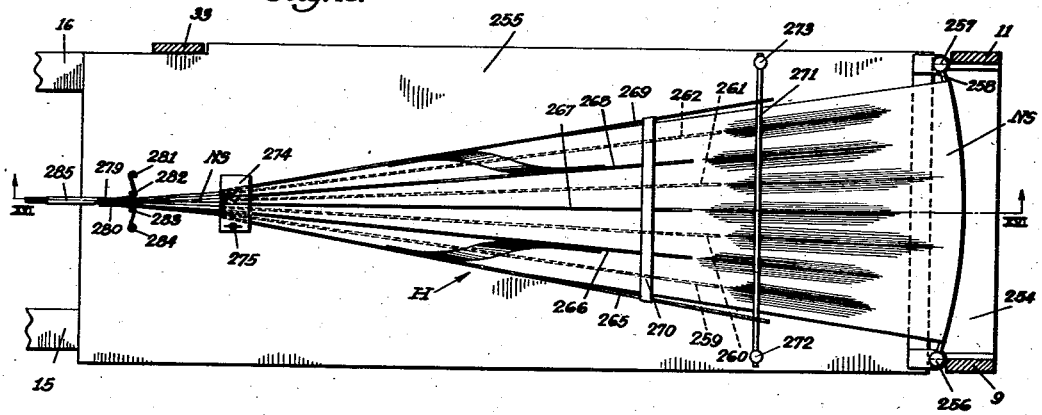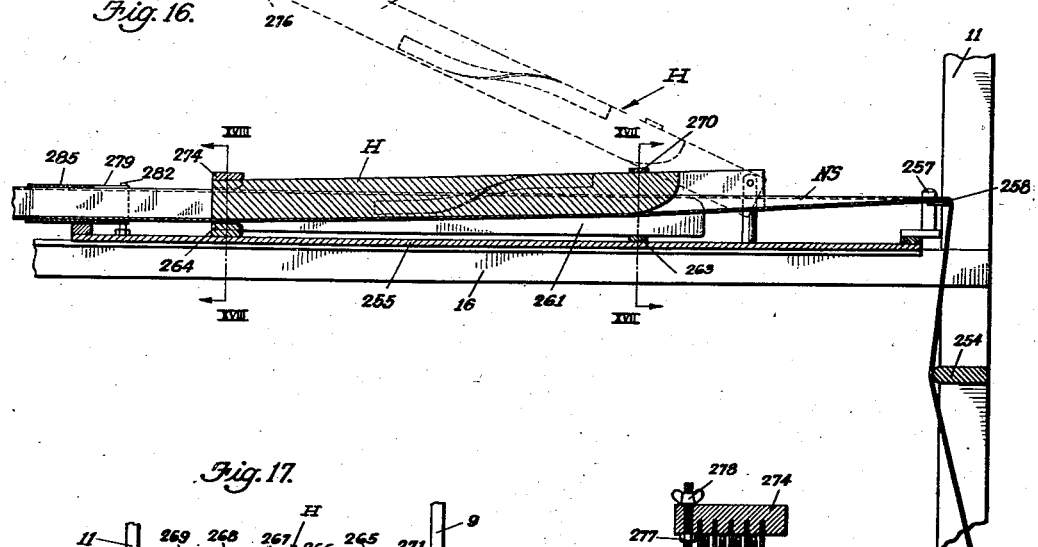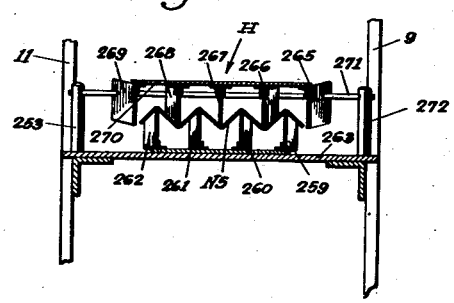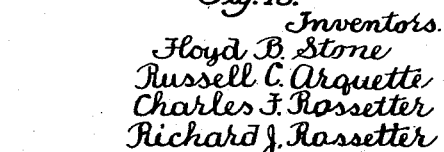

Patented Nov. 28, 1939

2,181,214

UNITED STATES PATENT OFFICE 2,181,214

PACKAGE MAKING MACHINE

Floyd B. Stone and Russell C. Arquette, San Francisco, and Charles F. Rossetter and Richard J. Rossetter, Los Angeles, Calif., assignors to Paul Hawkins Company, Los Angeles, Calif., a corporation of California Application May 18, 1936, Serial No. 80,350

10 Claims. (Cl. 93—39.1)

Our invention relates to a package-making machine and has particular reference to a machine for forming a container for confections and similar articles wherein a tubular container member is formed, a bottom inserted therein, a napkin, or other accessory is inserted in the container, and the finished container with its bottom and accessory is ejected from the machine, ready for the reception of contents to be placed therein.

In the packaging of certain commodities, such as ice cream, a tubular container formed of paper or other thin sheet material is employed, such containers being formed with a tubular body portion into one end of which is inserted a disc of sheet material to form a bottom, after which the container is passed to filling machines wherein the ice cream or other contents are inserted and a disc-like cover member is placed thereon. One particular form of such container is illustrated in the United States Letters Patent granted to Charles F. Allen and Selwyn Smith, No. 1,932,169 and dated October 24, 1933, wherein the tubular container is formed of a pair of strips of paper or similar material wound helically, the inner strip being wound with the edges of adjacent coils in abutting relation to each other and the outer strip being wound in overlapping relation to the junction adjacent the coils of the inner strip, such tube being cut to a desired length and a disc-like or cup-like bottom member being pressed inwardly from one end to form the bottom thereof, a similar disc or cup-like member being employed to close the top of the container after it has been filled. This container may be employed for ice cream or similar frozen confections by merely filling the tubular container with ice cream, water ices, sherbets, or other products, while the product is in a semiliquid or flowable condition, after which the container with its contents may be placed in a hardening room to harden and be preserved until ready for consumption.

When such tube is employed for containing ice cream and similar products the lower portion of the tubular member is formed as a handle portion by pressing the bottom member into a position spaced somewhat from the lower end of the tubular body providing a hollow chamber at the bottom of the container and this hollow space may be employed for the reception of a paper napkin or some other accessory assisting in the handling of the confection.

It is an object of our invention, therefore, to provide a machine which will manufacture such tubular container in commercial quantities at relatively low cost.

Another object of our invention is to provide a machine for manufacturing tubular containers of the character set forth, wherein paper strips are fed from a substantially continuous source of supply to a stationary mandrel and about which said strips are wound, one of said strips being wound directly in contact with the mandrel, with the adjacent coils thereof abutting each other and with the other strip wound about the coiled first strip, the center line of the second strip being arranged at approximately the junction between adjacent coils of the inner strip.

Another object of our invention is to provide a machine of the character set forth in the preceding paragraph, wherein the paper strips are continuously wound upon each other to form a substantially continuous length of tube and in which mechanism coordinated with the winding of the paper strips is employed to cut such tube into appropriate lengths as it is wound.

Another object of our invention is to provide a machine of the character set forth, wherein the sections of tube cut to length are delivered to a bottoming mechanism wherein a cuplike bottom is formed and is pressed into desired positional relation within the cut section of tube.

Another object of the invention is to provide a machine of the character set forth in the preceding paragraphs, wherein an adhesive is applied to the cuplike bottom member and to the interior walls of the tube as the bottom is inserted therein to constitute an adhesive, holding the bottom in its desired positional relation.

Another object of the invention is to provide a machine of the character set forth in the preceding paragraphs, wherein the waxing device is controlled by the mechanism which inserts the bottom to cause the spraying of wax from the spraying device only when said spraying device is passing through a predetermined area within the tube.

Another object of the invention is to provide a machine as set forth, wherein, in a single continuous operation a bottom disc is cut from a continuous supply of paper, is formed into a cuplike bottom member and is inserted into the cut section of tube to the desired positional relation.

Another object of the invention is to provide a napkin folding mechanism which will draw a supply of napkin stock from a substantially continuous supply thereof, automatically fold said napkin stock into a folded condition, and then automatically cut said folded napkin stock into the desired length and insert said cut lengths into the space formed between the bottom and the lower end of the cut section of tube.

Another object of the invention is to provide a mechanism as set forth in the preceding paragraph, wherein the cut length of napkin stock is subsequently refolded into a relatively compact member capable of being inserted into a small diameter container tube.

Other objects and advantages will be apparent from a study of the following specifications, read in connection with the accompanying drawings, wherein Figure 1 is a vertical elevational view of the front of a machine constructed in accordance with our invention;

Fig. 2 is a side elevational view of the left-hand side of our machine as viewed in Fig. 1;

Fig. 3 is a side elevational view of the right-hand side of our machine as viewed in Fig. 1;

Fig. 4 is a vertical sectional view, taken along line IV—IV of Fig. 1, a portion of the mandrel and turret being broken away to show the same in section;

Fig. 5 is a horizontal sectional view, taken along line V—V of Fig. 4;

Fig. 6 is a detail horizontal sectional view, taken along line VI—VI, Fig. 4;

Fig. 7 is a detail horizontal sectional view, taken along line VII—VII of Fig. 4;

Fig. 8 is a composite view, illustrating the turret and bottoming mechanism in section, taken along line VIII—VIII, of Fig. 1, but illustrating a portion of the gearing and bottom stock feeding mechanism in elevation disposed slightly to the left of said section line, as viewed in Fig. 1;

Figure 1:
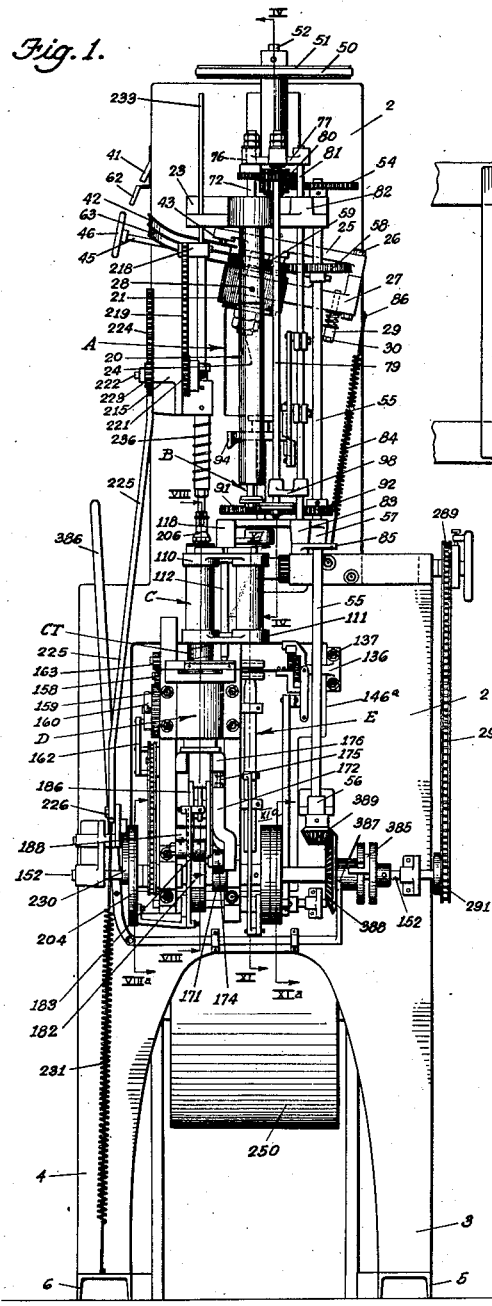
Figure 19:
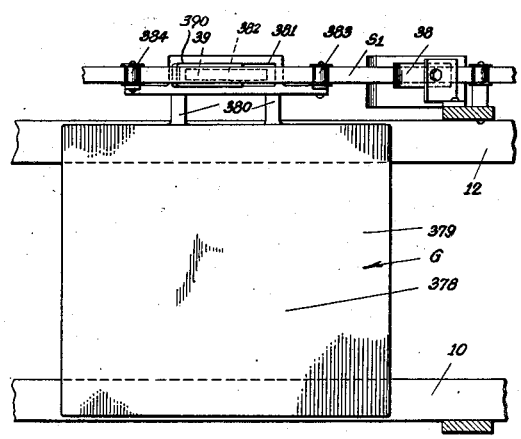
Figure 20:
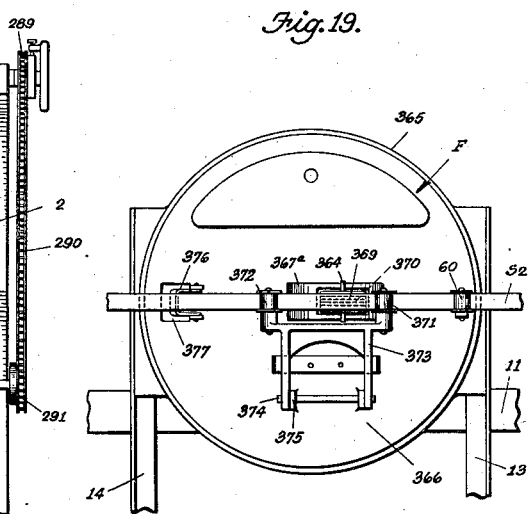

Fig. 8—a is a detail view of one of the cams employed in connection with the bottoming mechanism taken along line VIII—a—VIII—a of Fig. 1 and should be read in connection with Fig. 8 to coordinate the operation of the punchers and plungers employed in the bottoming mechanism shown in Fig. 8;

Fig. 9 is a detail sectional view of the bottoming mechanism, similar to Fig. 8, illustrating the bottom forming punch in its punching position;

Fig. 10 is a detail view, similar to Fig. 9, illustrating the bottom-forming plunger in its forming position, and illustrating the wax nozzle in its relation to the bottom-forming plunger;

Fig. 11 is a detail vertical sectional view, taken along line XI—XI of Fig. 1, and illustrating the napkin folding and inserting mechanism;

Fig. 11—a is a detail sectional view through one of the cams employed in the napkin folding and inserting operation, taken along line XI—a—XI—a of Fig. 1 and to be read in connection with Fig. XI to coordinate the napkin folding mechanisms with the napkin inserting mechanism;

Fig. 12 is a fragmentary sectional view of the napkin folding mechanism illustrated in Fig. 11 and showing the same in the position it assumes at the time the napkin is completely folded;

Fig. 13 is a detail sectional view, taken along line XIII—XIII of Fig. 11;

Fig. 14 is a detail horizontal sectional view of the turret, taken along line XIV—XIV of Fig. 11;

Fig. 15 is a detail horizontal view of the napkin fanning mechanism, looking in the direction of the arrow XV in Fig. 3;

Fig. 16 is a vertical sectional view, taken through the napkin fanning mechanism, along line XVI—XVI of Fig. 15;

Fig. 17 is a detail vertical sectional view taken along line XVII—XVII of Fig. 16;

Fig. 18 is a detail, sectional view, taken along line XVIII—XVIII of Fig. 16;

Fig. 19 is a detail plan view of the waxing mechanism, looking in the direction of the arrow XIX—XIX on Fig. 3; and Fig. 20 is a plan view of the gluing mechanism looking in the direction of the arrow XX—XX on Fig. 3.

Referring to the drawings, Figs. 1, 2 and 3 illustrate the assembly of a machine adapted to practice our invention, such machine including generally tube winding or forming mechanism A, tube cutting mechanism B for severing the wound tube into desired lengths or section, turret mechanism C for conveying the cut sections of tube to bottom-inserting mechanism, indicated generally at D, and napkin-folding and inserting mechanism, indicated generally at E, all of which are driven from the single motor 1. All of the mechanisms A, B, C, D and E are illustrated as being supported upon a face plate 2, near the front of the machine, such face plate being preferably formed as indicated particularly in Fig. 1 with a bifurcated lower end forming a pair of legs 3 and 4 adapted to rest upon base rails 5 and 6, respectively. The base rails 5 and 6 extend rearwardly from the face plate 2, and the face plate is braced thereon by a pair of braces 7 and 8. Erected upon the rails 5 and 6 is a framework consisting of an upright 9 extending upwardly from the rail 5 and having its upper end connected by a horizontal bar 10 to the rear surface of the face plate 2, while a similar vertical upright 11 extends upwardly from the rail 6 and has its upper end connected by means of a horizontal bar 12 to the rear face of the face plate 2.

The horizontal bars 10 and 12 are connected by cross bars 13 and 14 to each other laterally of the machine, and these cross bars also constitute a shelf for supporting a glue pot and gluing mechanism, indicated generally at F in Fig. 3. Similarly a wax pot and waxing mechanism, indicated generally at G in Fig. 3, is supported upon and extends laterally across the rails 10 and 11. Below the horizontal bars 10 and 11 a second pair of horizontal bars 15 and 16 extend between the rear surface of the face plate 2 and the uprights 9 and 11, respectively, to constitute a shelf upon which the napkin fanning mechanism H may be mounted.

In order to facilitate the more ready understanding of our invention, it is deemed advisable to segregate the various portions of the machine A, B, C, etc. and to take each of these elements up in detail as a separate section.

Tube winding apparatus

Since we have illustrated our invention as being particularly adapted for the manufacture of a tubular container for ice cream or similar confections we will describe the tube winding portion of our machine as particularly adapted for the manufacture of tubes of the type set forth in the Allen and Smith patent hereinbefore referred to.

The tube winding portions of our machine embody the principle disclosed in the applications for Letters Patent Serial No. 742,227 filed by Herbert S. Brown on August 31, 1934, and No. 752,210, filed by John L. Ferguson on November 9, 1934, respectively. This tube winding mechanism comprises essentially a stationary mandrel 20 against which a winding roller 21 bears to frictionally engage strips of paper therebetween to feed said strips of paper to the mandrel and to wrap the same around the mandrel and feed the tube so formed forwardly along the mandrel. The mandrel 20 is illustrated as being formed of a cylindrical metallic member, the upper end of which is rigidly secured and stationarily in a bore 22 (see Fig. 4) in a mandrel supporting bracket 23 which is in turn mounted upon the front face of the face place 2.

It will be observed that the mandrel 20 is supported only at its upper end, and has a considerable length preferably in excess of the length of one of the finished container tubes.

The winding roller 21 is rigidly secured to a shaft 24, which is disposed at an angle to the longitudinal axis of the mandrel 20 and preferably immediately at the rear of the mandrel 20. The shaft 24 is rotatably mounted in a roller bracket 25 pivoted at 26 to a mounting bracket 27. The mounting bracket 27 is secured to the front face of the face plate 2 upon a pivot pin 28 and from an inspection of Fig. 1 it will be observed that the pivot pin 28 is disposed immediately at the rear of the mandrel 20 and in a vertical plane drawn through the axis of the mandrel 20. It will also be observed that the pivot pin 28 constitutes a pivotal support for the mounting bracket 27 at the intersection between a plane passing through the axis of rotation of the shaft 24 and the said vertical plane passing through the longitudinal axis of the mandrel 20. The face plate 2 is provided with an outstanding lug 29 through which extends an adjusting screw 30 threadedly engaging the mounting bracket 27 near the outer end thereof so that by turning the adjusting screw 30 the mounting bracket 27 may be moved about its pivot 28 to change the angular relation between the axis of rotation of the shaft 24 and the longitudinal axis of the mandrel 20. This adjustment of the mounting bracket 27 changing the angular disposition of the roller 21, winds the strips of different widths upon the mandrel 20 and yet maintains the adjusting coils of the strips so wound in abutting relation with each other.

By referring particularly to Fig. 2, it will be observed that the frame of the machine at the rear of the face plate constitutes a support for a pair of reels 31 and 32, of which reel 31 indicates a reel of paper material to form the inner layer of the finished tube, while reel 32 indicates the reel of paper employed to form the outer layer of the container. As was described particularly in the Allen and Smith patent hereinbefore referred to, the paper employed to form the inner layer of the tube is considerably heavier than that employed to form the outer layer of the tube so that after the tube has been wound up it may be torn down by unwinding the coils constituting the inner layer of the container and the abutting edge of such strip of material will constitute substantial cutting edges, cleanly severing the strip forming the outer layer of material. The reel 31 is illustrated as being supported upon an upright 33, which extends from the side rail 6 and is preferably braced by being secured to the horizontal bars 6 and 12 constituting the left-hand side of the framework of the machine. The reel 31 may be rotatably attached to the upright 33 by means of a bolt 34 upon which the reel of paper 31 may be slipped and may be held in place thereon by means of a suitable washer 35 and a nut 36. The paper strip drawn from the reel 31, hereinafter referred to as S—1, is preferably fed over a guide roller 37, rotatably mounted upon the upright 33 and thence passes through a tensioning device 38 and over the wax coating apparatus G to coat one surface of the strip S—1 with a layer of wax for the double purpose of making this strip of paper moistureproof when the container is adapted to receive liquid or substantially liquid contents, and also for the purpose of providing a substantial lubrication assisting in the ready winding of this strip and to the feeding of this strip about the mandrel 20.

The waxing apparatus G will be described in full hereinafter, but for the purposes of describing it at this point, it suffices to say that the strip S—1 is drawn across a waxing roller 39 which dips into the wax contained within a wax pot 40 so that as the strip passes across this roller a thin coating of wax will be applied to what is then the underneath surface of the strip S—1. The strip then passes over a guide plate 41 and thence over a guide channel 42 supported upon a pin 43 mounted in the roller bracket 25. From an inspection of Fig. 1, it will be observed that the channel 42 is directed inwardly and downwardly toward the surface of the mandrel 20 so as to pass the strip S—1 immediately at the rear of the mandrel 20. This strip S—1 may then be wound about the mandrel between the roller 21 and the rear surface of the mandrel 20 so that as the roller 21 is rotated the strip S—1 will be continuously drawn off the reel 31 and continuously wound about the mandrel 20 in a helix with the adjacent edges of adjacent coils of the helix in closely abutting relation with each other.

In order to facilitate the threading of the strip S—1 between the roller 21 and the mandrel 20, we mount the shaft 24 on the roller bracket 25 and pivot this bracket at 26 so that it has a considerable movement forwardly and rearwardly relative to the mandrel 20. The amount of this movement may be controlled by a wedge 44 threaded upon a handwheel shaft 45 at the outer end of which is a handwheel 46 so that by turning the handwheel in one direction the wedge 44 is moved in a right-hand direction as shown in Fig. 1, this wedge 44 bearing upon a pin 47 carried by the roller bracket 25. This action will force the roller bracket 25 toward the mandrel 20 and will bring the roller 21 into close relation with respect to this mandrel, while movement of the handwheel 46 in the opposite direction will release the pressure of the wedge 44 and permit the roller 21 to retract from the mandrel. In order to cause the roller 21 to wind the strip S—1 about the mandrel 20, we apply motive power to the roller 21 from the motor 1. It will be observed that the motor 1 is mounted upon the rear face of the face plate 2 with its shaft 48 extending vertically thereof and has a pulley 49 coupled by means of a belt 50 to a main drive pulley 51. The main drive pulley 51 is rigidly secured upon a pulley shaft 52 which is rotatably mounted in a bearing 53a secured to and extending forwardly of the front face of the face plate 2.

The lower end of the pulley shaft 52 is provided with an elongated spur gear 53 which meshes with a gear 54 rigidly secured upon a power shaft 55. The power shaft 55 extends vertically of the machine, having a plurality of bearing supports, the upper of which is formed in the supporting bracket 23, the lowermost of which is formed by a bearing bracket 56 secured upon the front face of the face plate 2, while an intermediate bearing bracket 57 engages and supports the shaft 55 intermediate its ends. Immediately below the supporting bracket 23 is a beveled gear 58 which is in turn meshed with a bevel gear 59 rigidly secured to the roller shaft 24. Thus rotation of the drive shaft 55 by the motor 1 will apply rotary power to the roller 21. Due to the angular depression between the roller 21 and the mandrel 20 rotation of the roller 21 will cause the strip S—1 to be drawn from its reel 31 and to be fed about the mandrel 20 in the form of a helix and as this helix is formed on the mandrel the entire helix will be fed downwardly along the mandrel. In order to insure that the adjacent coils of the strip S—1, as they are wound about the mandrel, are in closely abutting relation with each other, but not in overlapping relation with each other, the operator of the machine should accurately adjust the angular disposition of the roller by means of the adjusting screw 30 after he has started the winding operation. This may be readily accomplished by observing the uppermost coils of the helix so formed upon the mandrel and adjusting the screw 30 until these adjacent coils are exactly in abutting relation.

By referring again to Fig. 2, it will be observed that the strip of material used to form the outer layer of the container is drawn from the reel 32, and since this strip acts as the binder for the adjacent coils of the inner layer formed by the strip S—1, this strip will be hereinafter referred to as S—2, and should have a coating of glue or other adhesive applied to one side thereof prior to its being wound around the mandrel. It will be observed that the strip S—2 passes directly from the reel 32 over a guide roller 60 which is preferably mounted upon the gluing mechanism F and which will be described in detail hereinafter, but at this point in the description it is sufficient only to note that the gluing mechanism includes a glue applying roller 61 over which the strip S—2 passes to receive a thin coating of glue or similar adhesive. From the glue applying mechanism F the strip S—2 passes over a guide plate 62 on the side edge of the face plate 2 and thence through a channel guide 63 disposed immediately below the guide chanel 42 and like the guide channel 42 is secured to the pin 43 on the roller bracket 25, the strip S—2 passing from the channel 63 around the mandrel 20, and in threading this strip S—2 initially the end of the strip S—2 should make two or three turns about the mandrel on the outside of the previously wound portion of the strip S—2 and with its glued surface fastening the outer surface of the strip S—2. In threading the machine, the operator preferably makes a few turns of the strip S—2 over the strip S—1, and then pastes the end of the strip S—1 directly to the strip S—2. Then when the motor 1 is started to mechanically drive the roller 21, this roller will frictionally engage both of the strip S—1 and S—2 and feed them helically around the mandrel, while, at the same time, the winding roller 21, the face of which is considerably broad, will press the strips S—1 and S—2 tightly toward the mandrel and will iron out the helices formed by the two strips, causing the outer strip S—2 to be smoothly glued to the inner strip, and thus forming a self supporting tube which will be fed along the length of the mandrel 20.

With the parts of the machine thus far described it will be observed that the strips S—1 and S—2 are fed from either reels 31 and 32, respectively, and are wound about the mandrel to form an elongated tubular member which may be cut into any desired length to form the finished container.

Since it is desired that the machine shall operate substantially continuously, we prefer to provide auxiliary reels 31a and 32a of strip material suitably supported upon the frame of the machine ready to be put into operation as soon as one of the reels 31 or 32 becomes exhausted. The reel 31a may be secured to the upright 33, near the upper end thereof upon a bolt or pin 34a and held in place by means of a washer 35a and a nut 36a. Likewise the reel 32a may be supported upon the rear upright 11 upon a similar bolt, washer and nut assembly. Thus when the reel 31 becomes exhausted it is but a simple matter to start the end of the reel 31a, thread the same over a guide roller 37a (disposed immediately above the roller 37) and then the strip S—1 is drawn from the reel 31a and may be threaded to the mandrel in the same manner as hereinbefore described. In like manner when the reel 32 becomes exhausted the strip S—1 may be started from the fresh reel 32a and may be fed from a guide roller 60a and thence to the mandrel in the same manner as was hereinbefore described for the strip S—2. To prevent the rapid unwinding of the strips S—1 and S—2 from their reels, tensioning members 64 may be employed to bear upon the reels.

It will be observed that the mandrel 20 has considerable length in excess of the coil required to wind the strips S—1 and S—2 upon each other and to iron them out so that a substantially great length of tube T is always upon the mandrel 20. However, to prevent unnecessary friction between the long length of tube T and the length of the mandrel 20, we prefer to reduce the diameter of the mandrel 20 after it has passed the portions thereof contacted by the aligning roller 21. This reduced portion is indicated particularly in Fig. 4, at 20a.

Tube cutting apparatus

The strips S—1 and S—2 are now wound in an elongated tube extending along the mandrel 20 and may be cut into the desired lengths to form the containers by means of the tube cutting apparatus B. This cutting apparatus is particularly shown in Figs. 1 to 7, inclusive, and comprises a pair of shearing wheels 70 and 71. The diameter of the shearing wheel 70 is preferably substantially the same as the exterior diameter of the tube forming mandrel 20. That is, the diameter of the shearing wheel 70 should substantially conform with the interior diameter of the tube T which is formed by the winding of the strips S—1 and S—2 about the mandrel as hereinbefore described.

The shearing wheel 70 is rigidly secured upon the lower end of a shaft 72 which extends through a bore 73 extending longitudinally through the mandrel 20 and concentrically with the longitudinal axis thereof. The cooperating cutting wheel 71 is illustrated as being rigidly secured upon the lower end of a shaft 79, the upper end of which is rotatably mounted in the bearing bracket 77 and has a drive gear 80 rigidly secured thereto, immediately below the bearing bracket 77. From an inspection of Fig. 5 it will be observed that the drive gear 80 for the shaft 79 is continuously meshed with the spur gear 78 which drives the shaft 72 for the cutting wheel 70 so that during the time the motor 1 is operating to wind and form the tube T, the cutting wheel 71 will also be continuously rotating.

The bearing bracket 77 is illustrated as being rigidly secured to the upper end of a rod 81 which passes downwardly through a bearing 82 formed upon the bearing bracket 23, and has its lower end guided in a bearing 83 formed upon the bearing bracket 57 for the drive shaft 55. The rod 81 is preferably both rotatably and slidably mounted in its bearings 82 and 83 and is normally urged toward its uppermost position as shown in Fig. 1 by means of a spring 84 engaging between a crankarm 85 (secured to the lower end of the rod 81) and some stationary part of the machine, such as the side of the face plate 2, as indicated at 86.

It will also be observed from an inspection of Figs. 1 and 3 that the crankarm 85 extends to a considerable distance laterally of the rod 81 so that the spring 84 not only tends to hold the rod in its uppermost position but also tends to swing the rod in a counterclockwise direction as viewed in Figs. 5, 6 and 7.

Since the sole support for the bearing bracket 77 is constituted by the rod 81, it will be apparent that under the influence of the spring 84 the bearing bracket 77 will not only be normally urged to its most elevated position, as shown in Fig. 1, but will also be urged in a counterclockwise direction, as viewed in Fig. 5, thus tending to swing this bracket in a direction opposite to the arrow shown in Fig. 5, and thus holding the cutting wheel 71 in laterally spaced relation to the exterior of the tube T formed upon the mandrel 20. At certain stages in the operation of the tube winding portion of the machine, this cutting wheel 71 should be drawn inwardly toward the tube T until the cutting wheel 71 overlaps the cutting wheel 70 and this movement of the rotating cutting wheels 70 and 71, relative to each other, will cause these two wheels to shear the tube T.

In view of the fact that during the time the cutting wheels 70, 71 are in overlapping relation to shear the tube T, the tube is moving downwardly along the mandrel, it is essential that the cutting wheels must also move downwardly along the mandrel at substantially the same rate at which the tube is being fed. This compound movement may be readily accomplished by providing a control cam 87 upon a stub shaft 88, the upper end of which is journaled in a bearing bracket 89 and the lower end of which is journaled in a bearing bracket 90, both brackets being secured to the front face of the face plate 2. The stub shaft 88 is provided with a gear 91 which meshes with a spur gear 92 secured to the drive shaft 55. The ratio of gearing between the gears 91 and 92 is such that the cam 87 is given one complete rotation during the forming and feeding of that much of the length of tube T as is desired to cut in order to form a finished container. The cam 87 has a pair of cam surfaces 93 and 94 thereon (see Figs. 4 and 6), the cam surface 93 projecting laterally of the cam 87 to engage a pin 95 upon the outer end of a crankarm 96 rigidly clamped as at 97 to the rod 81 so that whenever the cam 87 is rotated to engage its cam surface with the crankarm 96, the crankarm will be moved to the position shown in dotted lines in Fig. 6 and will thereby swing the rod 81 to such position as will bring the cutting disc 71 to the dotted line position shown in Figs. 6 and 7; that is, in shearing or overlapping relation with the cutting wheel 70.

At this point it should be observed that the lower end of the shaft 79 which carries the cutting wheel 71 is rotatably supported by one end of a link 98 secured to the shaft 81 as by means of a set-screw 99.

Immediately prior to the engagement of the crankarm 96 by the cam surface 93, the cam surface 94 engages a roller 100 (see Fig. 3) on a lever 101 and moves this lever downwardly. The lever 101 is pivoted at 102 to the bearing bracket 89, the outer end of the lever 101 being connected as at 103 to the lower end of a link 104, the upper end of which connects to an arm 105 rigidly clamped to the rod 81.

From an inspection of Figs. 3 and 4 it will be observed that the downward movement of the lever 101 under the influence of the cam surface 94, will cause the rod 81 to be drawn downwardly, carrying with it the bearing bracket 77 which in turn carries the shafts 73 and 79 with the cutting wheels 70 and 71 downwardly with respect to the mandrel. The shape of the cam surface 94 is such that the downward movement of the cutting wheels 70, 71 will be substantially at the same speed as the lower end of the tube T moves downwardly as it is formed and fed upon the mandrel.

The combination of the movement of the cutting wheels 70 and 71 toward each other and their downward movement relative to the mandrel 20, will cause the cutting wheels to shear the tube T cleanly along a horizontal plane without interfering in any manner with the downward feeding of the tube T. After the section of the tube T which projects beyond the cutting wheels 70 and 71 has been severed from the remainder of the tube, the cam surfaces 93 and 94 will move out of engagement with their respective members 96 and 101 and the spring 84 will restore the cutting wheel 71 to its uppermost position and at the same time will cause the rod 81 to be lifted back to its extreme uppermost position, preparing the cutting wheels 70 and 71 for the next cutting operation. In this manner it will be apparent that predetermined lengths of the tube formed upon the mandrel 20 will be cut off from the tube at regular intervals, the length of the cut sections being determined entirely by the speed of rotation of the cam 87 relative to the rate at which the tube T is formed and fed along the mandrel.

It will be apparent to those skilled in the art that the amount of actual time consumed in making a cut and shearing off the predetermined length of the tube T will be relatively small as compared with the length of time required to wind up such length of tube.

From an inspection of Fig. 4, it will be observed that the position of the cutting wheel 70 shown in full lines represents the position of this wheel at the time a cut is to be made and the position of the cutting wheel 70, as shown in dotted lines of this figure, illustrates the total distance through which the cutting wheel will move during the time of making one cut.

It will also be apparent that the machine thus far described will continuously form and feed the tube T along the length of the mandrel and such tube will be cut into predetermined lengths by the cutting mechanism B to continuously form a plurality of cut lengths of tube ready to receive bottoms, napkins, or other accessories, thereto.

It will also be observed that the cutting discs 70, 71 will cut the tube by a shearing action wherein the entire wheel 70 will act as a rigid support filling the interior of the tube, while the cutting disc 71 is performing its shearing operation, and thus there will be no tendency to crush the tube or to tear the paper of which the tube is formed during the cutting operation.

Turret B

The sections of tube now cut to length are ready to receive the bottoms and should be conveyed out of the path of the advancing tube T constituting the next section so that we find it desirable to transport the cut section of tube laterally out of the path of the advancing tube T. We shall hereinafter refer to the cut section of tube as CT to distinguish the same from the length of tube T remaining on the mandrel in uncut condition.

By referring particularly to Figs. 1, 2, 3, 4 and 14, it will be noted that the turret C is constructed of a pair of spiders 110, 111 each of which is provided with four openings 113. The openings 113 in the spiders are spaced at four equidistant points radially from the center of the spider to constitute openings into which may be seated the opposite ends of four tubular members constituting tubular casings 114, 115, 116 and 117. The internal diameter of the tubular casings 114—117 is slightly in excess of the external diameter of the cut section of tube CT so that the assembled turret constitutes four cylindrical chambers anyone of which may be aligned with the lower end of the mandrel to receive the descending end of the tube.

By referring particularly to Figs. 1, 2, 3 and 4 it will be observed that the shaft 112 extends downwardly through a bore 118 in the bearing member 57 to extend through the centers of the spiders 110, 111, the spaced spiders forming bearings which permit the turret to rotate upon the shaft 112 but which prevents any substantial lateral displacement thereof. A boss 119 formed upon and extending below the lower spider 111 has a ball 120 received in its end, the material of the boss 119 being peened over about this ball so that the ball 120 may rest upon a die plate 121 (which will be more fully described hereinafter) to form a foot supporting the turret in upwardly spaced relation above the die plate 121.

By referring particularly to Figs. 4 and 7 it will be observed that the upper spider 110 has either formed thereon, or rigidly secured thereto, a starwheel 122 which includes a plurality of arms 123 each disposed at 90° with relation to the other about the shaft 112 and each having a slot 124 formed therein extending radially with respect to the shaft 112 and adapted to be engaged by a pin 125 on a Geneva driver 126. The Geneva driver 126 is rigidly secured to the stub shaft 88 upon which the cam 87 is mounted so that as the shaft 88 is rotated to cause the cutting mechanism B to cut a section from the tube T, the star wheel 122 will be advanced one-quarter of a revolution to move the cut section of tube CT away from the advancing end of the tube T and to present the next tubular casing in alignment with the advancing end of the tube C.

In the embodiment illustrated herein, it is assumed that the tubular casing 114 is ready to receive the cut section of tube CT so that upon one rotation of the shaft 88 to make the cut the tubular casing 114 will be advanced to the next position and the tubular casing 117 will be placed immediately beneath the tube T ready to receive the next cut section.

In order to insure that the turret will move exactly through one-quarter of a revolution and will remain in this position until the next rotation of the Geneva drive wheel 126, we prefer to provide a spring catch 127 in the form of a spring-pressed ball which will seat in one of the slots 124.

It will be noted at this point that the tubular casings 114—117 are open at their bottoms so that the cut sections of tube CT received in any one of these will be free to fall therefrom unless supported by some other means. It will be noted, however, from an inspection of Figs. 1-8 and 14 that the die plate 121 has a shelf 128 secured thereto and extending forwardly thereof in a position to lie immediately below the lower end of the turret casing 115. That is, this plate is disposed immediately below that one of the turret chambers which has received a cut section of tube and has moved to its next quarter-revolution position. It will also be observed from an inspection of Fig. 14 that that one of the turret casings 114 which is aligned to receive the cut section of tube is disposed in spaced relation to the shelf 128 so that the cut section of tube would tend to fall through the casing 114.

By properly timing the start of the movement of the turret C with the time of completion of the cut made by the cutting mechanism B, the cut section of tube will be moving to a position above the shelf 128 during the time it takes for the cut section of tube to fall through the turret casing 114 and thus the lower end of the cut section of tube will come to rest upon the shelf 128 and be supported thereby.

By referring particularly to Fig. 4, it will be observed that the length of the cut section of tube is represented by the distance between the lower face of the cutting disc 70 and the dotted line 129, the tube T advancing through the distance equal to the amount of vertical movement of the cutting wheel 70 during the cutting operation so that at the end of the cutting operation the lower end of the cut tube section CT will be approximately at the dotted line indicated at 130. It will be observed that in this position the lower end of the cut section of tube has only partially passed through the turret casing 114 and it is during the remainder of the movement of this tube section through the casing 114 and the level indicated by the line 131 that the rotational movement of the turret is made.

It will therefore be noted that as soon as the section of tube CT is cut from the tube T it is transported to a position 90° away from the descending end of the tube T. The turret holds the cut tube section CT in this position until after the next section is cut from the tube and the turret is then again advanced through an arc of 90° to present the first cut section CT immediately above the die plate 121. During the time the cut tube CT is resting upon the shelf 128 it is allowed additional time for the drying of the adhesive which was employed to secure the outer and inner layers of paper strips together so that the cut section of tube CT is substantially rigid and dry by the time it is delivered over the die plate 121.

During the time the cut tube section is held above the die plate 121 the bottom for the tube may be formed and inserted therein and upon the next movement of the turret the cut section of tube will be delivered to a position immediately above the napkin inserting mechanism E to receive a napkin therein and finally, upon the next quarter-turn movement of the turret C, the completed tube with its bottom and napkin will be brought back into a position of alignment with the mandrel 20 to the descending end of the tube T. In this position there will be no support for the lower end of the tube section CT and it will fall by gravity from its chamber in the turret, while the next section of the tube cut from the tube T is entering that chamber of the turret.

Bottoming mechanism

Since the cut sections of tube are being carried by the turret C in a series of intermittent or step-by-step movements, a bottom may be formed and inserted in the lower end of the tube during one of the pauses made by the tube as it is being conveyed by the turret. The mechanism for forming and inserting the bottom in the tube section CT is illustrated particularly in Figs. 2, 8 through 10, inclusive.

In the embodiment of the invention described herein, the bottom for each of the tubes is preferably formed by punching a disc of paper from a strip of paper and then forming this disc into a cuplike member which may be pressed into the lower end of the tube to a desired depth. These bottoms may be formed from a strip of bottom stock BS which is preferably selected to be of such weight as to hold its shape after it has been formed into a cuplike bottom member. The bottom stock is illustrated in Fig. 2 as being supplied from a reel 140 supported in any suitable manner as indicated in Fig. 2 upon the upright 33, and from which the strip BS may be drawn through an oiling mechanism 141 which consists essentially of an oil chamber having a wick 142 wiping upon one surface of the bottom stock BS. From the oiling mechanism 141 the bottom stock is passed up to continuously rotating feed rollers 143 and 144 rotatably mounted in a bearing plate 145 attached to a rail 146 and secured upon and projecting forwardly of the face plate 2. (The face plate 2 may be provided with a suitable slot 146a, accommodating the paper feeding mechanism.) The feed roller 143 is normally spring-pressed toward the roller 144 by means of mounting the roller 143 upon the lever arm 147 pivoted at 148 upon the bearing member 145 and urging this lever toward the bearing plate 145 by means of a spring 149. The feed roller 144 is rigidly secured to a drive sprocket 150 driven by means of a chain 151 from a cam shaft 152 (see Figs. 1 and 2). The feed roller 144 also has a gear 153 mounted thereon and continuously in mesh with a gear 154 on the feed roller 143, so that both of these rollers will be driven at the same speed to continuously draw the bottom stock BS from the roller and feed the same toward the bottoming mechanism.

The bottom stock BS proceeds from the continuous feed rollers 143, 144 through a pair of intermittently rotated feed rollers 155, 156 also mounted upon the bearing plate 145, a loop 157 being formed in the strip BS between the continuously operating feed rollers 143, 144 and the intermittent rollers 155, 156.

The feed roller 156 has secured thereto a gear 158 meshed with a gear wheel 159, the outer face of which is provided with a plurality of radially extending flanges 160 adapted to be engaged by a pin 161 on a Geneva driver arm 162 secured directly to the sprocket 150 employed to drive the feed rollers 143, 144 so that after each revolution of the drive sprocket 150 the gear wheel 159 will be driven through one-quarter of a revolution to thus cause the intermittent feed rollers 155, 156 to intermittently feed a predetermined length of the bottom stock across and immediately below the die plate 121. The feed roller 155 preferably has a gear 163 thereon meshed continuously with the gear 158 so that this roller, like roller 156, is positively driven and the roller 155 may be mounted upon a lever 164 pivoted at 165 on the rail 146 to be spring-pressed toward the roller 156 by means of a spring 166.

The bottom stock BS, intermittently moved forwardly by the intermittent drive 155, 156 passes through a slot 167 formed between the lower surface of the die plate 121 and a cylinder 168. Within the cylinder 168 a cutting die 169 is reciprocably mounted to be moved vertically toward the die plate 121 to cut a paper disc from the bottom stock BS each time the bottom BS is moved forwardly. The die plate 121 is provided with a die surface 170 formed on the lower surface thereof to constitute the complementary die surface against which the die plunger 169 may operate to assist in the shearing or cutting of paper disc from bottom stock BS.

The die plunger 169 is reciprocated vertically by means of a cam 171 secured to the cam shaft 152, and rotated through one revolution upon each revolution of the cam shaft 152. A lever 172 pivoted at 173 upon the rail 146, has its lower end provided with a roller 174 which bears upon and rides upon the surface of the cam 171, the lever 172 being provided with an upstanding foot 175 adapted to rest immediately below and in engagement with a fork 176 (also pivoted at 173) the upper surface of the fork rests immediately against the lower end of the die plunger 169. Thus upon each rotation of the cam shaft 152 the die plunger 169 will be raised to the position shown in Fig. 9 and then will be permitted to retract back to its normal rest position, as shown in Fig. 8. The uppermost position assumed by the plunger 169 may be adjusted, if desired, by adjusting the length of the footpiece 175, which is illustrated as comprising a threaded member which is threaded into a shelf 177 formed upon the lever 172 and may be held in the desired adjusted position by means of a lock-nut 178.

The bottom disc BD formed by the operation of the die plunger 169, is now ready to be formed into the cuplike bottom member ready for insertion into the bottom end of the cut tube section CT. As shown in Figs. 8 through 10 inclusive, the die plunger 169 has a central bore 179 within which reciprocates a forming plunger 180, the upper end of this plunger 180 being preferably slightly rounded at its peripheral edge to constitute a smooth surface for pressing the bottom disc BD upwardly and through a forming die surface 181 extending through the die plate 121 so that vertical reciprocation of the forming plunger 180 will press the disc BD into an inverted cuplike bottom member. The vertical reciprocation of the forming plunger 180 may be controlled by a cam 182 also mounted upon the shaft 152, upon which rides a roller 183. The roller 183 is carried by a pin 184 the outer ends of which bear a pair of links 185, 186, the upper ends of which engage in curved recesses 187 at the lower end of the forming plunger 180.

In order to prevent forward and rearward displacement of the links 185, 186 as they are lifted and lowered by the cam 182, a secondary link 188 may be provided, engaging the pin 184 and having its rear end pivoted to the rail 146 as indicated at 189.

From an inspection of Fig. 8, it will be observed that the relative positions of and the relative curvatures of the cam surfaces of the two cams 171 and 182 is such that the first operation which takes place upon the rotation of the cam shaft 152 is to lift the die plunger 169 to punch the disc from the strip of bottom stock and after the shaft has completed approximately 60° more of its rotation, the forming plunger 180 will be lifted to start the forming operation to form the disc into cuplike bottom members.

It will be noted however that during the initial upward movement of the forming plunger 180 the die plunger 169 will be holding the annular portions of the surface of the disc BD tightly against the shoulder 190 between the forming die 181 and the die 170 so as to evenly clamp the disc about its periphery during the start of the forming operation and thus will insure that the upward movement of the forming plunger 180 will produce a cup-like form in the bottom disc substantially as shown in Fig. 10. As hereinbefore noted, the bottom stock BS has been given a thin coating of oil which constitutes not only a lubricant for the disc BD as it is pressed through the forming die 181, but also assists in softening the fibers of the paper stock to some extent to prevent undue tearing or cutting thereof, as the disc BD is formed into its cuplike shape.

It will also be noted from an inspection of Figs. 8 and 10 that the forming plunger 180 has a considerably greater length of stroke than the die plunger 169 so as to permit the forming plunger to pass upwardly through the forming die 181 and to enter a considerable distance within the lower end of the cut section of tube CT. The relative positions of the forming plunger, the die plunger and the cupped disc BD at this time is illustrated particularly in Fig. 10.

As hereinbefore explained, it is desirable that the bottom formed by the disc BD should be pressed upwardly into the cut section of tube CT to a position a considerable distance above the lower end of the tube CT so as to provide a space or chamber in the lower portion of the tube for the insertion of a napkin or other accessory. For the purpose of pressing the bottom disc BD up to its inwardly spaced position, the forming plunger 180 is provided with a central bore 191 through which extends a stem 192 carrying upon its upper end an elongated carrier plunger 193, nesting in the forming plunger 180 in an enlargement 194 of the bore 191. The lower portion of the stem 192 is guided in a suitable bushing bearing 195 located at the rear or lower end of the forming plunger 180, the stem extending downwardly beyond the lower limit of the forming plunger to connect with a cross head 196.

From an inspection of Figs. 8 and 8a it will be observed that the cross head 196 is connected by means of a bolt 197 and a link 198 to a lever 199 which is pivoted at 200 to the flange 146 and carries intermediate its ends a roller 201 secured to the lever 199 by means of a pin 202. The roller 201 projects into and operates within a cam slot 203 formed upon the face of a cam 204 also rigidly secured to the cam shaft 152 so that as the cam shaft completes one revolution the carrier plunger 193 will be moved upwardly and then downwardly.

By referring to Fig. 10, it will be observed that after the disc BD has been formed in a cuplike bottom any further upward movement of the carrier 193 will slide this cuplike bottom member upwardly into the tube section CT to the position indicated in dotted lines at 205. As the bottom disc BD is forced up into the tube CT it will tend to lift the tube. This upward thrust, however, is resisted by disposing a plate 121a immediately above the turret C so as to engage the upper end of the tube and constitute an abutment preventing any appreciable upward movement of the tube CT.

As was hereinbefore described, the bottom is held in its desired position within the tube section CT by means of a suitable adhesive, perhaps the most desirable being wax and such adhesive or wax may be applied both to the bottom disc BD and to an annular space around the interior walls of the tube CT by means of a waxing nozzle 206. It will be noted from an inspection of Figs. 1, 8 and 10 that the waxing nozzle is carried upon the lower end of a tubular nipple 207 through which wax may be supplied to the nozzle, the point of egress of the wax from the nozzle being through a wax gate 208 formed in and passing through the lower face of the nozzle 206 and adapted to be closed by a ball valve 209 normally pressed by a spring 210 which bears between a pin 211 and the upper surface of the ball valve 209 to normally urge the ball valve into seating, or valve-closing, relation with respect to the wax gate 208.

The tubular nipple 207 which carries the waxing nozzle 208 extends upwardly through a wax-containing cylinder 212 (see Figs. 1 through 3) adapted to be supplied with wax from the wax pot 40 through a pipe 213. The nipple 207 is provided with a longitudinal slot communicating with the interior thereof, as indicated at 214 (see Fig. 2) which permits wax from the cylinder 212 to pass into the interior of the nipple 207 and thence to pass downwardly through the nipple to the nozzle 206. The cylinder 212 is illustrated as being supported upon a bracket 215, secured to the front face of the face plate 2 and is provided at both of its ends with a stuffing box 216 and 217, respectively, so that the nipple 207 may reciprocate through the cylinder 212 without danger of leakage of the wax between the cylinder and the nipple. The upper end of the nipple 207 is connected as by a lug 218 to the upper end of a gear rack 219. The upper end of the nipple 207 is locked in place on the lug 218 by means of a locknut 220. From an inspection of Figs. 1 and 2 it will be observed that the gear rack 219 is meshed with a gear 221 rigidly secured to a stub shaft 222 rotatably mounted in the gearing bracket 215, the shaft 222 having a second gear 223 thereon meshed with a gear rack 224 formed upon the upper end of a rod 225 pivotally connected at 226 to the outer end of a link 227. The inner end of the link 227 is pivoted at 228 to the left-hand bearing bracket 230 which constitutes the left-hand bearing for the cam shaft 152.

The link 227 carries a roller 229 which rides upon a cam 230 also carried by the cam shaft 152 so that as the cam shaft 152 is rotated through one complete revolution the cam 230 will permit the rod 225 to first be moved downwardly and then upwardly to produce first a downward stroke and then an upward stroke on the nipple 207 and the wax nozzle 206. In order to insure a positive downward movement of the rod 225 we prefer to provide a tension spring 231 connected at 226 to the link 227, the opposite end of the spring 231 being connected at 232 to some stationary part of the frame of the machine. It may be desirable to provide a guide for the upper end of the nipple 207 independent of the stuffing box 216 and we have illustrated the same as comprising a rod 233 connected to the lug 218 and extending upwardly through the bearing bracket 23.

The relative positions and surfaces of the cams 230 and the cam slot 203 (which controls the movements of the carrier plunger 193) is such that when the carrier plunger is in the position shown in Fig. 10 (that is just at the completion of the forming operation performed upon the bottom disc BD) the waxing nozzle 206 is in its lowermost position. In this position the waxing nozzle 206 is almost in contact with the upper surface of the forming disc BD and a pin 234 passing through the bottom face of the nozzle 206 is brought into engagement with the upper surface of the forming disc BD.

The foregoing operation will cause the pin 234 to be moved inwardly of the waxing nozzle 206 to engage and lift the ball valve 209 from its seat in the wax gate 208, allowing wax which has accumulated in the nozzle 207 to pass downwardly through the gate. Since it is desired to apply the adhesive not only to the forming disc BD but also to the interior wall of the tube section CT, we prefer to form the wax exits of the nozzle 206 as radially extending ports 235 communicating with the wax gate 208. The waxing nozzle has a plurality of these ports 235 to insure a substantially even distribution of the wax throughout an annular area of the interior wall of the tube section CT. It will be noted that the wax is thus sprayed upon the interior wall of the tube CT immediately above the disc BD so that the carrier plunger 193 now starts to ascend and will press the disc BD upwardly into the tube CT past the area which has been waxed.

It should be noted at this point that the wax being liquid it forms a substantial lubricant, facilitating the movements of the disc BD upwardly in the tube CT, in the dotted line position shown in Fig. 10 and passes out about the time the disc will arrive at the dotted line position and commences to cool so as to form an adhesive holding the disc in this position.

It should also be observed that the spraying of the wax occurring at the time the nozzle 206 is disposed almost in contact with the disc BD, sprays a quantity of the wax over the upper surface of the disc BD and a film of wax is thereby formed both upon the upper surface of the disc BD, rendering the same moistureproof and also injecting a considerable quantity of such wax at the annular space formed by the curved junction between the peripheral flange of the disc BD and its upper face.

It should also be noted that the roller 229 merely rides upon the surface of the cam 230 and the relative location of the cam surface 230 and the cam surface 204 is such that when the carrier plunger 193 rises above the forming plunger 180 it will bring the disc BD into contact with the valve of the waxing nozzle 206 and further upward movement of the carrier plunger 193 will, as it presses the disc BD upwardly into place, lift the waxing nozzle 206 upwardly with it to thus insure that the wax will be sprayed freely throughout this last part of the upward movement of the disc BD to its dotted line position as shown in Fig. 10. Thus causes the distribution of the wax throughout this complete area. When the waxing nozzle 206 is lifted by the carrier plunger it will merely lift the roller 229 off of its cam 230 and by this construction careful timing of the cam 230 with the cam surface 204 is obviated. When the plunger 193 reaches the uppermost limit of its stroke, this plunger will start to descend and at this time the cam 230 will, in its rotation, continue the upward movement of the nozzle 206 through its entire limit of stroke. The carrier plunger 193 in descending will be retracted into the forming plunger 180 until the lower end of the plunger 193 engages the shoulder formed between the enlargement 194 and the remaining portions of the bore 191, and as the forming plunger 193 is drawn further downwardly, it will carry the forming plunger 180 to its lowermost position, as shown in Fig. 8.

At this point it should be observed that the length of the slot 214 and the nipple 207 should be such that during one stroke of the nipple 207 through the cylinder 212 only such quantity of wax will be admitted to the nipple 201—203 as will be permitted to be ejected by the nozzle 206 during that same stroke of the nipple 207. In this way the wax which is delivered to the nozzle 206 may be kept relatively hot until its ejection, since prior to the start of the downward stroke of the nipple 207 the wax is contained within the cylinder 212 and may be heated therein to any desired temperature by means of a heating coil 236 wrapped around the cylinder 212 and electrically insulated therefrom by any suitable means well known in the art. Also the wax, being delivered through the small tube or pipe 213 from the wax pot 40, requires that the pipe 213 should also be kept hot and this may be accomplished by supplying a heating element for the pipe 213, or by connecting the pipe 213 itself in an electric circuit wherein these pipes constitute a conductor for electric current.

It will be understood that all of the foregoing operations of the die plunger 169, the forming plunger 179, the carrier plunger 193, and the waxing nozzle 206, will have occurred during one pause between successive steps of movement of the turret C. It will also be observed that the cutting of the disc BD, the forming thereof, and the placing thereof within the tube CT will all occur during the pause in the intermittent feeding movement of the bottom stock BS by the intermittently operated feed rollers 155—156, so that after the bottom BD has been placed within the tubing section CT and the various plungers have been withdrawn therefrom, the turret C is free to be moved to its next stop while during such movement of the turret the intermittent feed rollers 155, 156 are operated to feed a new length of bottom stock into the space below the die plate 121, ready for a subsequent bottom-forming operation upon the next tube, carried in the next chamber of the turret C.

It will therefore be observed that at this stage of operation of the machine, the tube section CT has been wound, cut-off, delivered to the bottoming mechanism, and has received a bottom therein.

*Napkin folding and inserting mechanism*

The tube having its bottom spaced inwardly from the lower end thereof, is now ready to receive the napkin or other accessory to be inserted in the lower chamber of the tube CT. In order to facilitate an understanding of the napkin inserting mechanism, the napkin folding mechanism should also be considered at this time.

In the embodiment of the machine illustrated herein, the accessory which is to be inserted into the bottom chamber of the tube CT is a paper napkin, which is particularly desirable when the container formed by our machine is to be used in connection with ice cream or similar liquid, or semi-liquid, products. The napkin may be formed and folded in any suitable manner, and supplied to the machine for insertion into the bottom chamber of the tube CT, though we prefer to continuously and automatically fold such napkin from a roll of paper napkin stock, the entire folding operations being performed by our machine.

Referring particularly to Figs. 1, 2, and 3, it will be observed that a roll 250 of paper napkin stock NS may be rotatably mounted upon the frame of the machine, as, for example, mounting such roll upon a rod 251 supported in a pair of brackets 252, 253 secured, respectively, to the uprights 9 and 11 constituting a part of the frame of the machine. From the roll 250 the napkin stock NS may be drawn upwardly over a guide plate 254 to a fanning device H, which will fold the strip of napkin stock along a plurality of longitudinal lines to fold the same into a plurality of convolutions. The fanning device H consists essentially in a base plate 255, the rear end of which carries a pair of vertical supports 256, 257, between which extends a bowed guide wire 258 so that as the napkin stock NS is drawn thereover the side edges of the napkin stock will tend to draw slightly toward each other. Secured to the base plate 255 are a plurality of upright blades 259, 260, 261, and 262, these blades extending substantially longitudinally of the plate 255, the rear ends of the blades being secured in spaced relation to each other upon a blade carrier strip 263 so that all of the blades project above the plate 255 at substantially right angles thereto. The forward ends of the blades 259, 262 are all secured to a blade block 264 in relatively closely spaced relation to each other so that as the napkin stock NS is drawn over these blades it is formed thereover in a series of convolutions, the number of which is determined by the number of blades 259, 261, and as the napkin stock progresses across these blades, these convolutions are brought closer and closer together until when the napkin stock passes beyond the blade block 264 the entire width of the napkin stock NS has been folded, or convoluted into a fan-shaped form, the total width of which is but a fraction of the total width of the napkin stock.

To assist in the folding of the napkin stock over the blades 259—262, we provide a second set of blades 265, 266, 267, 268 and 269, the rear ends of which are all supported upon a blade strip 270 in equidistantly spaced relation to each other. The outside blades 265—269 preferably extend rearwardly to engage a pivot rod 271 supported upon a pair of uprights 272 and 273 rising from the plate 255 to permit the upper set of blades 265—269 to be elevated to the dotted line position shown in Fig. 16 during the threading of the napkin stock across the fanning device H.

It will be observed from an inspection of Figs. 15 and 17 that the spacing of the blades in the upper set 265—269 is substantially equal to the spacing of the blades in the lower set (259—262) from each other so that when the upper set of blades is folded down into the full line position shown in Figs. 15, 16 and 17 one of the lower blades will enter into the space between the two adjacent upper blades and will be disposed substantially centrally of said space.

The forward ends of the upper set of blades 265—269 are supported in an upper blade block 274, which is disposed immediately above the blade block 264, and the blades in the upper set gradually approach each other in the same manner as was described with reference to the blades in the lower set so as to draw the convolutions toward each other, as was described with reference to the lower blades. Thus by the mere drawing of the paper stock NS through the fanning device H, the napkin stock is folded along longitudinal lines into the shape described. The spacing of the blade blocks 264 and 274 from each other determines the width of each of the convolutions into which the napkin stock is folded and this width may be varied by changing the spacing between these two blade blocks by means of an adjusting screw 275 on the blade block 274, which projects downwardly therethrough, in such manner that the head 276 thereof engages and rests upon the blade block 264. The effective length of the adjusting screw 275 may be varied by altering the position of a locknut 277 and a wingnut 278 as will be apparent from an inspection of Fig. 18.

The fanned or convoluted napkin stock NS now passes beyond the blade blocks 264, 274 through a creaser which may consist of a pair of leaf spring members 279, 280, one disposed on each side of the folded napkin stock, and arranged to bear toward each other and engage the napkin stock between them. The leaf spring 279 may be supported upon the plate 255 by means of passing the same about a pair of upright posts 281, 282, as indicated in Fig. 15, while a similar support of the leaf spring 280 on posts 283 and 284 may be employed.

When the convoluted napkin stock NS leaves the creaser 279, 280 it enters a channel-shaped guide 285 which guides this stock toward the face plate 2 of the machine, producing a right angle twist therein as illustrated particularly in Figs. 2 and 3.

The motive power for drawing the napkin stock from its roll 250 is illustrated particularly in Figs. 3 and 11, as comprising a pair of feed rollers 286 and 287 between which the napkin stock NS is gripped and fed. The roller 287 is mounted upon a shaft 288 which carries a sprocket 289 arranged to be driven by means of a chain 290 from a sprocket 291 mounted upon the extreme right-hand end of the cam shaft 152 as viewed in Fig. 1.

The roller 287 also has a gear 292 formed thereon constantly meshed with a gear 293 on the roller 286 so that each of these rollers is positively driven by power transmitted through the cam shaft 152 and coordinated in timed relation with the movements of the cam shaft 152 and the cams controlled and operated thereby.

By referring particularly to Fig. 11 it will be observed that the napkin stock feed rollers 286 and 287 are both journaled in a bearing member 294 secured to the face plate 2 and projecting through a slot 295 formed through the face plate 2.

Disposed immediately below the feed rollers 286, 287 is a napkin cutting knife 296, and immediately below the knife is a napkin hopper 297 into and through the vertical portions of which the extending end of the napkin stock NS is fed by the rollers 286, 287. The vertical extent of the napkin hopper 297 is slightly in excess of the desired length of a section of the napkin stock necessary to form a napkin when the same is cut from the supply of napkin stock. The cutting knife 296 is pivoted at 298 upon a shearing block 299, secured to the face plate 2 (see Figs. 11 and 13).

The knife 296 is normally disposed in the position shown in full lines in Figs. 11 and 13 and is adapted to swing from this position first rearwardly to the position indicated by the center line 300, and then forwardly to the position indicated by the center line 301 during one cutting operation.

It will be noted that as the knife moves to the position shown at 301, it will sever the extending end of the napkin stock from the remainder of the stock.

The knife 296 is operated through its series of positions by means of an oscillating lever 302 pivoted at 303 upon a bracket 304 secured to the face plate 2. From an inspection of Fig. 11 it will be observed that the lever 302 projects upwardly in the path of movement of a crankarm 305 attached to and operating with the shaft 288 upon which the feed roller 287 is mounted so that as the feed roller 287 is moved in the direction of the arrow appearing thereon in Fig. 11, the lever 302 will first be drawn rearwardly and then as the pin 306 on the crankarm 305 passes the upper end of the lever 302, the lever will be swung forwardly toward the base plate 2 under the influence of a spring 307.

The spring 307 surrounds a bar 308 secured to the rear face of the face plate 2, and having an elongated slot 309 therein through which the lever 302 projects, one end of the spring 307 abutting a washer 310 engaging the rear surface of the lever 302, while the opposite end of the spring 307 engages a washer 311 at the outermost end of the bar 308. The lever 302 is connected to the knife 296 by means of a link 312 and the spring 307 is selected of such strength and characteristics that when the lever 302 has been retracted and is then released by the crank-arm 305, the spring will snap the lever 302 forwardly to swing the knife 296 to the position 301 with a substantial snap action.

It will be observed from an inspection of Fig. 13 that the outer end of the knife 296 is provided with a tailpiece 313 adapted to engage a short compression spring 314 seated in a circular bore 315 in the face plate 2, one end of the spring 314 bearing upon a plate 316 secured to the front face of the face plate 2. It will thus be apparent that when the knife 296 is swung to its forwardmost position 301 the tailpiece 313 will engage the spring 314 to impart a slight rebound to the knife 296.

Since the knife is actuated by a snap action it is necessary that some means be provided to prevent a secondary cutting operation of the knife after it has made one cut, and for this purpose we prefer to provide a holding mechanism which will catch the knife 296 upon its rebound and hold the same until the next retraction of the lever 302 by the crankarm 305. This holding mechanism may comprise a lockbar 317 pivoted at 318 upon the bar 308 and having a notch 319 in one side thereof, adapted to bear against that upper portion of the lever 302 which projects above the bar 308. The rear portion of the notch 319 is beveled slightly so as to offer no resistance to the rearward movement of the lever 302, even though the lockbar 317 is normally spring pressed by means of a spring 320 toward an engaging relation with the lever 302. The front portion of the notch 319 is provided with a rightangle shoulder 321 adapted to engage in front of the lever 302 to prevent forward movement of the same. However, when the lever 302 is retracted by the crankarm 305 and is then suddenly released by the passage of the pin 306 over the end of the lever 302, the snap action given the lever 302 upon its forward movement should be so great as to advance the lever 302 beyond the shoulder 321 before the spring 320 can bring this shoulder into engagement therewith, but upon the retraction or rebound of the knife 296 under the influence of the spring 314, the lock lever 317 will now be in a position to engage the lever 302 in the notch 319 and prevent a second forward movement of the knife 296.

The cut length of napkin stock should now be folded laterally into a relatively small compass so that it may be inserted in the hollow chamber 10 in the lower end of the tube section CT and this is accomplished by means of the napkin folding and inserting mechanism including a pair of lateral folding blades 330 and 331 secured to a block 332 supported upon a reciprocating cross head 333 slidably mounted upon a pair of guide rods 334 and 335, secured in a bracket 336 (see Fig. 3) mounted upon the front face of the face plate 2, as indicated at 337. The rear end of the rods 334 and 335 (the left-hand ends thereof as viewed in Fig. 11) are interconnected by means of a cross bar 338, while the forward ends of these rods (the right-hand ends as viewed in Fig. 11) are similarly interconnected by means of a cross bar 339 to constitute a guide frame along which the cross head 333 may reciprocate in a horizontal direction. It will be noted also from an inspection of Fig. 11, that the napkin hopper 297 has a forwardly extending portion 340 which extends through the face plate 2 to a position disposed below the turret C and preferably aligned with that one of the tubular casings of the turret which has just been moved from the bottom inserting position of the machine.

The forward end of the extending portion 340 of the napkin trough 297 is provided with a slot 341 into which may pass a secondary holding plate 342 carried upon a cross head 343 mounted upon and reciprocating upon the guide rods 334 and 335.

In the operation of laterally folding the napkin, the cross heads 333 and 343 are drawn toward each other until the blades 330, 331 are brought into overlapping relation with the secondary blade 342, as shown particularly in Fig. 12, to cause the blades 330, 331 to engage the napkin, press the same forwardly in the extension 340 of the napkin hopper 297 and to cause the blade 342 to engage the napkin intermediate the blades 330, 331 to fold the center of the napkin back in between these blades. The reciprocation of the folding blades 330, 331 is accomplished by securing the cross head 333 to a link 344 which is in turn connected to a lever 345 pivoted upon the stub shaft 200 in a bearing member 347a mounted upon the front face of the face plate 2. The lever 345 carries a roller 347 which engages in a cam slot 348 in a cam 349 (this cam also being carried upon and rigid with the cam shaft 152). The shape of the cam slot 348 and its relation to the remaining cams on the shaft 152 is such that during the time when the cam mechanism is operating to punch and form the bottoms BD the cross head 333 moves forwardly to press the cut section of napkin stock into the extension 340 of the napkin trough 297.

The secondary folding plate 342 is moved inwardly of the extension 340 during the same time, but at a slower speed, by means of a gear rack 350 mounted upon the cross head 343 which carries the blade 342, the gear rack 350 meshing with the gear 351 rotatably secured upon a shaft 352 supported upon the bracket 336 which carries the guide rods 334 and 335. Rigid with the gear 351 is a second gear 353 which meshes with a gear rack 354 secured to the cross head 333. Thus as the cross head 333 moves forwardly, the cross head 343 will be brought rearwardly until the folding blades 330, 331 and 342 assume the position shown in Fig. 12. The folding blades 330, 331 and 342, are then retracted to their normal positions, as shown in Fig. 11, leaving the folded cut section of the napkin stock NS in the position shown in Fig. 12, ready to be pressed between the interior chamber formed in the lower end of the tube CT.

The insertion of the napkin NS in the tube CT is now accomplished by a napkin inserting plunger 355 mounted for vertical reciprocation in a bracket 356 secured to the front face of the face plate 2. The napkin inserting plunger 355 has a lug 357 secured thereto and coupled by means of a link 358 to a lever 359 pivoted upon the stub shaft 200 and having a roller 360 operating in a cam slot 361 upon a cam 362, the cam 362 being mounted upon the same cam shaft 152 upon which the remaining cams are mounted.

The shape of the cam slot 261 and its relation to the remaining cams, is such that during the latter portions of the time consumed by the forming and insertion of the bottom BD in the tube CT, the napkin inserting plunger 355 is moved upwardly to engage the folded napkin NS (in the position shown in Fig. 12) and to move this napkin upwardly into the bottom of the tube CT to the dotted line position thereof shown in Fig. 12. It should be noted from an inspection of Figs. 11 and 12 that the extension 340 of the napkin hopper 297 is provided with a pair of aligned vertical openings 363 and 364 through which the plunger 355 operates, permitting the napkin NS to be pushed up through the slot 363 and into the bottom of the tube CT.

As hereinbefore described, in connection with the operation of the turret C, immediately after the insertion of the napkin in the bottom of the tube CT, the next possible operation of the turret C will carry the tube CT from the napkin inserting position in alignment with the now descending end of the tube T on the mandrel, and at this point the completed tube CT, with its napkin, will fall out of the turret, ready for filling.

*Glue pot F*

By referring particularly to Fig. 20, it will be observed that we have provided a glue pot particularly adapted for operation with our machine, this glue pot consisting essentially of a cylindrical pan or container 365 having a cover 366 thereon from which is suspended a roller 367 at least the major portion thereof being immersed in the glue pan 365. The upper surface of the top 366 is provided with a vertically extending bearing member 367ª in which is journaled a shaft 364 carrying a glue-applying roller 369, this roller preferably being provided with a plurality of annular peripheral slots 370 adapted to hold a quantity of glue upon the periphery of the roller. The roller 369 bears in contacting relation upon the roller 367 so that glue picked up by the roller 367 is transferred to the roller 369. It will also be observed from an inspection of Figs. 2 and 20 that the paper strip S—2 is passed directly over the upper surface of the roller 369 and is guided into positive contact therewith by means of a pair of guide rollers 371 and 372 mounted upon a frame 373 pivoted at 374 to a pair of uprights 375 extending from the top 366 of the glue pot.

By this construction the entire frame 373 may be lifted to assist in the threading of the paper strip S—2 over the glue-applying roller 369. If desired a scraper 376 may be provided, this being illustrated as an inverted U-shaped strip of metal carried by the top 366 of the glue pot and disposed immediately above a drip opening 377 in the glue pot top.

As the excess glue is scraped from the underneath surface of the strip S—2, it will fall through the drip hole 377 and back into the glue pot. The glue pot may be provided with any suitable heating mechanism to keep the glue warm and at the desired consistency and viscosity. The wax pot G is illustrated particularly in Figs. 2, 3 and 19 as comprising a substantially rectangular pan 378 having a cover 379. An extension 380 at one of the side walls of the pan 378 provides a sump 381 communicating with the interior of the pan through which melted wax within the pan may pass out thereof. Suitable heating mechanism may be applied to the wax pot to maintain the wax therein at a predetermined temperature.

Rotatably mounted in the sump 381 is a wax-applying roller 382, over which the paper strip S—1 passes, said strip being guided into contacting relation therewith by a pair of guide rollers 383 and 384.

If desired, the scraper 390 illustrated as being an inverted U-shaped strip of metal may be provided to scrape the excess wax from the strip S—1 and return the same to the sump 381.

*Summary*

It will be observed, therefore, that we have provided a unitary machine for winding tubular containers from strips of paper, or similar material, and in which the containers will be cut off to a desired length and be delivered to a bottoming mechanism, wherein bottoms will be inserted to prepare the containers for the reception of the contents. Also the cut sections of tubing will be delivered to napkin or other accessory inserting device which will insert a napkin or other accessory into the bottom end of the container and the finished container, with its accessory, will be delivered ready for the reception of the contents.

It should be noted that the cam shaft 152 which controls the bottoming, the napkin folding and inserting operations, is preferably connected to its source of driving power through the agency of a clutch 385, which may be controlled by means of a clutch handle 386, the clutch 385 being preferably a pin type clutch, one element of which is connected directly to the cam shaft 152, while the other element is secured to a hub 387 engaged by a cooperating bevel gear 389 on the lower end of the drive shaft 55.

Thus during the threading operations of the machine which may necessitate the operation of the winding roller 21 to start the winding of the tube T, the bottoming and napkin folding and inserting mechanisms may be rendered idle until the completion of the threading operations and insure that these mechanisms will be operated only when properly formed cut sections of tube are delivered to the turret.

While we have shown and described the preferred embodiment of our invention, we do not wish to be limited to any of the details of construction shown herein, except as defined in the appended claims.

We claim:

1. In a machine for manufacturing tubular containers from strip material, means for supporting a supply of said strip material, a mandrel, means for winding said strip material helically about said mandrel to form said strip material into a helically wound tube and to advance said tube so formed along said mandrel, means disposed at one end of said mandrel for cutting said tube so formed into predetermined lengths, a turret for receiving said cut lengths of tube and for transporting the same laterally out of the path of the advancing tube on said mandrel, bottoming means disposed out of alignment with said mandrel, including means for forming a bottom for said cut sections of tube and means for inserting said bottoms into said cut sections of tube while said sections are held in said turret, means coordinated with said cutting means for moving said turret to convey said cut sections of tube out of the path of the advancing of the tube on the mandrel and to said bottoming means, and means for discharging said tube from said turret after said bottom has been placed in said tubes.

2. In a bottoming means for inserting bottoms in tubular containers to form bottoms therefor, means supporting a supply of bottom stock strip material from which discs may be cut to form bottoms for said containers, bottom forming means including a cylinder, a cutting and forming die plate constituting one end of said cylinder, and having a forming portion of one diameter, a cutting portion of a larger diameter, and a clamping shoulder defined between said two diameters, a cutting die plunger reciprocable through said cylinder toward and away from said die plate, a forming plunger reciprocable through said cutting die plunger toward and away from said die plate, means for supporting an open ended tube above said die plate, feeding means to feed said bottom stock between said die plate and said cylinder, means for intermittently operating said feeding means, means for moving said cutting die plunger upwardly toward said die plate to cut a disc from said bottom stock and to clamp said disc against the shoulder of said plate, means for reciprocating said forming plunger toward said disc while it is held clamped to press said disc through said forming die to form said disc into a cuplike bottom member and to press said bottom member upwardly into the lower end of a tube held in said supporting means.

3. In a bottoming means for inserting bottoms in tubular containers to form bottoms therefor, means supporting a supply of bottom stock strip material from which said bottom discs are formed, bottom forming means including a cylinder, a cutting and forming die constituting one end of said cylinder, a cutting die plunger reciprocable through said cylinder toward and away from said die plate, a forming plunger reciprocable through said cutting die plunger toward and away from said die plate, means for supporting an open ended tube above said die plate, means for intermittently feeding said bottom stock strip between said die plate and said cylinder, means for moving said cutting die plunger upwardly toward said die plate to cut a disc from said bottom stock and to clamp said disc against said plate, means for reciprocating said forming plunger toward said disc while it is held clamped to press said disc through said forming die to form said disc into a cuplike bottom member and to press said bottom member upwardly into the lower end of a tube held in said supporting means, a carrier plunger reciprocably mounted in said forming plunger, and means for moving said carrier plunger upwardly beyond the limit of movement of said forming plunger to carry said formed disc upwardly into said tube in spaced relation with the bottom edge thereof.

4. In a machine for manufacturing tubular containers from strip material, means for supporting a supply of said strip material, a mandrel disposed with its longitudinal axis extending in a vertical direction, means for winding said strip materal helically about said mandrel to form said strip material into a helically wound tube and to advance said tube so formed downwardly along said mandrel, means disposed at the lower end of said mandrel for cutting said tube so formed into predetermined lengths, conveyer means for receiving said cut lengths of tube and for transporting the same laterally with respect to said mandrel, bottoming means disposed in laterally offset relation with respect to said mandrel and including means for forming a bottom for said cut sections of tube, means for pressing said bottoms into said cut sections of tube while said sections are held in said conveyer means, and means coordinated with said cutting means for moving said conveyer means to convey said cut sections of tube out of the path of the downwardly advancing tube on the mandrel and to said bottoming means.

5. In a machine for manufacturing tubular containers from strip material, means for supporting a supply of said strip material, a mandrel disposed with its longitudinal axis extending in a vertical direction, means for winding said strip material helically about said mandrel to form said strip material into a helically wound tube and to advance said tube so formed downwardly along said mandrel, means disposed at the lower end of said mandrel for cutting said tube so formed into predetermined lengths, conveyer means for receiving said cut lengths of tube and for transporting the same laterally with respect to said mandrel, said conveyer means being disposed such distance below said cutting means that the cut section of tube will fall by gravity to said conveyer means at a rate greater than the downwardly advancing movement of the tube on the mandrel, a bottoming means disposed in laterally offset relation to said mandrel and including means for forming and inserting a bottom into the cut lengths of tube while said lengths are held in said conveyer means, and means for coordinating the movement of said conveyer means with the operation of said cutting means to move each cut length of tube out of the path of the downwardly advancing tube on the mandrel.

6. In a machine for manufacturing tubular containers from strip material, means for supporting a supply of said strip material, a mandrel disposed with its longitudinal axis extending in a vertical direction, means for winding said strip material helically about said mandrel to form said strip material into a helically wound tube and to advance said tube so formed downwardly along said mandrel, means disposed at the lower end of said mandrel for cutting said tube so formed into predetermined lengths, conveyer means for receiving the cut lengths of tube, for holding said cut lengths of tube with their longitudinal axes disposed in a vertical direction and for transporting said cut lengths of tube laterally with respect to said mandrel, said conveyer means being disposed such distance below said cutting means that the cut section of tube will fall by gravity to said conveyer means at a rate greater than the downwardly advancing movement of the tube on the mandrel, a bottoming means disposed in the path of movement of said conveyer and offset laterally with respect to said mandrel for vertically pressing a bottom into said cut lengths of tube while said lengths are held in vertical position in said conveyer, and means coordinating the movement of said conveyer with said cutting means to move said cut lengths of tube out of the path of the downwardly advancing end of the tube on the mandrel.

7. In a machine for manufacturing tubular containers from strip material, means for supporting a supply of said strip material, a mandrel disposed with its longitudinal axis extending in a vertical direction, means for winding said strip material helically about said mandrel to form said strip material into a helically wound tube and to advance said tube so formed downwardly along said mandrel, means disposed at the lower end of said mandrel for cutting said tube so formed into predetermined lengths, conveyer means for receiving said cut lengths of tube and for transporting the same laterally with respect to said mandrel, bottoming means disposed in laterally offset relation with respect to said mandrel and including means for forming a bottom for said cut sections of tube, means for pressing said bottoms into said cut sections of tube while said sections are held in said conveyer means, and means for moving said conveyer means in a step by step movement coordinated with said cutting means and with said bottoming means to hold the conveyer stationary during the entry of the cut lengths of tube therein, to move said cut lengths laterally out of the path of the downwardly advancing end of the tube on the mandrel and to hold the cut length of tube stationary during the insertion of the bottoms therein.

8. In a machine for manufacturing tubular containers from strip material, means for supporting a supply of said strip material, a mandrel disposed with its longitudinal axis extending in a vertical direction, means for winding said strip material helically about said mandrel to form said strip material into a helically wound tube and to advance said tube so formed downwardly along said mandrel, means disposed at the lower end of said mandrel for cutting said tube so formed into predetermined lengths, comprising a turret mounted for movement about a vertical axis offset laterally from the axis of said mandrel and including a plurality of tubular receptacles disposed to be successively moved into alignment with the advancing end of the tube on the mandrel, said receptacles being disposed at such distance below the cutting means that the cut lengths of tube will fall by gravity into said receptacles at a rate greater than the downwardly advancing movement of the tube on the mandrel, a bottoming means disposed in the path of movement of said receptacles and including means for pressing the bottom vertically into the cut lengths of tubes while the same are held in the receptacles, and means for moving said receptacles in a step by step movement including holding the receptacles stationary during the descent of the cut lengths of tube thereinto, then moving the receptacle with the tube into alignment with the bottoming means and then holding the receptacle stationary during the operation of the bottoming means.

9. In a machine for manufacturing tubular containers from strip material, means for supporting a supply of said strip material, a mandrel disposed with its longitudinal axis extending in a vertical direction, means for winding said strip material helically about said mandrel to form said strip material into a helically wound tube and to advance said tube so formed downwardly along said mandrel, means disposed at the lower end of said mandrel for cutting said tube so formed into predetermined lengths, comprising a turret mounted for movement about a vertical axis offset laterally from the axis of said mandrel and including four tubular receptacles disposed in evenly spaced relation about the axis of rotation of said turret and alignable successively with said mandrel to receive and hold cut lengths of tube from said mandrel, said receptacles being disposed at such distance below the cutting means that the cut lengths of tube will fall by gravity into said receptacles at a rate greater than the downwardly advancing movement of the tube on the mandrel, a bottoming means disposed in the path of movement of said receptacles and in offset relation to the axis of said mandrel for vertically pressing a bottom into said cut lengths of tubes while said tubes are held in said receptacles, a napkin inserting means disposed in the path of movement of said receptacles and in laterally offset relation to both said mandrel and said bottoming means for vertically pressing a napkin into said tubes while the tubes are held in said receptacles, a discharge opening disposed in the path of movement of said receptacles and in lateral offset relation to said mandrel, said bottoming means and said napkin inserting means to permit the tubes to fall from said receptacles when said receptacles are aligned therewith, and means for moving said turret in a step by step motion to successively and repeatedly hold said receptacles stationarily disposed in alignment with said mandrel, said bottoming means, said napkin inserting means and said discharge opening, and for moving said receptacles from one of said means to the other to move the cut lengths of tube out of the path of the downwardly advancing end of the tube on said mandrel.

10. In combination with a machine for forming tubular containers by continuously winding strip material helically about a mandrel to form a continuously advancing tube cut into predetermined lengths of a bottoming means disposed out of alignment with the mandrel of the forming machine, said bottoming means including means for forming a bottom for said cut sections of tube and means for inserting said bottoms into said sections of tube, means for conveying said lengths of tubes from the mandrel and for transporting said tube lengths out of the path of the advancing tube on the mandrel and into alignment with said bottoming means, and means coordinating with the cutting mechanism of said tube forming machine for intermittently moving said conveying means in a step by step movement to convey the cut lengths of tube from the mandrel to the bottoming means and for holding said lengths of tubes stationarily aligned with said bottoming means during the operation of said bottoming means.

FLOYD B. STONE.
      RUSSELL C. ARQUETTE.
      CHARLES F. ROSSETTER.
      RICHARD J. ROSSETTER.